United States Patent
Zhu et al.

(10) Patent No.: US 11,943,139 B2
(45) Date of Patent: Mar. 26, 2024

(54) ROUTE CONFIGURATION METHOD AND APPARATUS

(71) Applicant: Huawei Technologies Co., Ltd., Shenzhen (CN)

(72) Inventors: Qianghua Zhu, Reading (GB); Hancheng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/156,719

(22) Filed: Jan. 19, 2023

(65) Prior Publication Data

US 2023/0164066 A1 May 25, 2023

Related U.S. Application Data

(63) Continuation of application No. PCT/CN2021/106823, filed on Jul. 16, 2021.

(30) Foreign Application Priority Data

Jul. 23, 2020 (CN) .......................... 202010720012.7

(51) Int. Cl.
*H04L 12/46* (2006.01)
*H04L 9/40* (2022.01)
*H04L 45/42* (2022.01)

(52) U.S. Cl.
CPC .......... *H04L 45/42* (2013.01); *H04L 12/4641* (2013.01); *H04L 63/0236* (2013.01)

(58) Field of Classification Search
CPC . H04L 45/42; H04L 12/4641; H04L 63/0236; H04L 45/38; H04L 63/0272; H04W 40/02
See application file for complete search history.

(56) References Cited

U.S. PATENT DOCUMENTS

2019/0223135 A1 * 7/2019 Park ...................... H04W 76/34
2021/0345113 A1 * 11/2021 Parron ................. H04L 12/4645

FOREIGN PATENT DOCUMENTS

| CN | 111436160 A | 7/2020 | |
| EP | 3962027 B1 * | 8/2023 | ......... H04L 12/4633 |
| WO | 2020029922 A1 | 2/2020 | |
| WO | WO-2021067913 A1 * | 4/2021 | ........ H04W 36/0061 |

OTHER PUBLICATIONS

Lin, Chujian et al., "Research and application of port isolation based on asymetric VLAN", Mar. 2015, total:8pages.

* cited by examiner

*Primary Examiner* — Cheikh T Ndiaye
(74) *Attorney, Agent, or Firm* — Slater Matsil, LLP

(57) ABSTRACT

This application provides a route configuration method and an apparatus, and relates to the field of communication technologies. The route configuration method includes: A session management network element obtains VLAN information of a first port, where the first port is a port, which corresponds to an established PDU session of a first terminal, on a first user plane network element, and the first user plane network element is a user plane network element that serves the first terminal. The session management network element generates first routing information and second routing information based on the VLAN information of the first port, and sends the first routing information and the second routing information to the first user plane network element.

19 Claims, 8 Drawing Sheets

ROUTE CONFIGURATION METHOD AND APPARATUS

CROSS-REFERENCE TO RELATED APPLICATIONS

This application is a continuation of International Application No. PCT/CN2021/106823, filed on Jul. 16, 2021, which claims priority to Chinese Patent Application No. 202010720012.7, filed on Jul. 23, 2020. The disclosures of the aforementioned applications are hereby incorporated by reference in their entireties.

TECHNICAL FIELD

This application relates to the field of communication technologies, and in particular, to a route configuration method and an apparatus.

BACKGROUND

A local area network (LAN) in a fixed network is formed by interconnected switches. The switches support forwarding of unicast packets and broadcast packets. The LAN supports a virtual local area network (VLAN) technology. Using the VLAN technology can logically divide a network into a plurality of broadcast domains (that is, VLANs). If a plurality of hosts belong to a same VLAN, these hosts may communicate with each other. If a plurality of hosts belong to different VLANs, these hosts may not directly communicate with each other. The VLAN technology can effectively control occurrence of broadcast storms.

A 5G local area network (5GLAN) service is a service provided by a current 5G network, and is mainly used in home communication, enterprise office, factory manufacturing, the internet of vehicles, power grid reconstruction, public security departments, and the like. A 5GLAN service can provide private communication of an internet protocol (internet protocol, IP) type or a non-IP type (such as an Ethernet type) for two or more terminal devices in a group of terminal devices. For example, devices in a factory form a group, and different devices may send Ethernet data packets to each other. Alternatively, office devices (such as mobile phones, computers, or laptop computers) of employees in a department of an enterprise form a group, and different office devices may send IP data packets to each other. If two terminal devices are not in a same group, the two terminal devices cannot communicate with each other.

Currently, when the 5GLAN communicates with the external LAN, how to enable a network element in the 5GLAN to correctly handle an Ethernet packet of a terminal is an urgent technical problem to be resolved.

SUMMARY

This application provides a route configuration method and an apparatus, so that a user plane network element in a 5GLAN correctly handles an Ethernet packet.

According to a first aspect, a route configuration method is provided, including: A session management network element obtains VLAN information of a first port, where the first port is a port, which corresponds to an established PDU session of a first terminal, on a first user plane network element, and the first user plane network element is a user plane network element that serves the first terminal. The session management network element generates first routing information and second routing information based on the VLAN information of the first port, where the first routing information is used by the first user plane network element to handle a first packet, the first packet is an uplink packet of the first terminal received by the first user plane network element through the first port, the second routing information is used by the first user plane network element to handle a second packet, and the second packet is a downlink packet to be sent by the first user plane network element to the first terminal through the first port. The session management network element sends the first routing information and the second routing information to the first user plane network element.

Based on the foregoing technical solution, in a scenario in which a 5GLAN communicates with an external LAN, the VLAN information of the first port may reflect a networking manner and a VLAN configuration of a network in which the first terminal is located. The first routing information and the second routing information are generated based on the VLAN information of the first port. Therefore, the session management network element sends the first routing information and the second routing information to the first user plane network element, so that the first user plane network element may handle the first packet based on the first routing information, and handle the second packet based on the second routing information. As a result, a manner in which the first user plane network element handles an Ethernet packet may adapt to the networking manner and the VLAN configuration of the network in which the first terminal is located, to ensure normal communication of the external LAN.

In a possible design, the VLAN information of the first port includes a combination of one or more of the following: a default VID of the first port, an allowed VID list of the first port, or an untagged VID list of the first port.

In a possible design, the first routing information includes the default VID of the first port and the allowed VID list of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when the allowed VID list of the first port includes a VID carried in the first packet; or the first routing information indicates the first user plane network element to discard the first packet when the allowed VID list of the first port does not include a VID carried in the first packet.

In a possible design, the first routing information includes the default VID of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when a VID carried in the first packet is the same as the default VID of the first port; or the first routing information indicates the first user plane network element to discard the first packet when a VID carried in the first packet is different from the default VID of the first port.

In a possible design, the second routing information includes the allowed VID list of the first port and the untagged VID list of the first port. That the second routing information is used by the first user plane network element to handle a second packet includes a combination of one or more of the following: the second routing information indicates the first user plane network element to discard the second packet when the second packet carries a VID and the allowed VID list of the first port does not include the VID carried in the second packet; the second routing information indicates the first user plane network element to send the second packet through the first port when the allowed VID list of the first port includes a VID carried in the second packet and the untagged VID list of the first port does not include the VID carried in the second packet; or the second routing information indicates the first user plane network element to remove a VID carried in the second packet and send the second packet without the VID through the first port when the allowed VID list of the first port includes the VID carried in the second packet and the untagged VID list of the first port includes the VID carried in the second packet.

In a possible design, the second routing information includes the default VID of the first port. That the second routing information is used by the first user plane network element to handle a second packet includes a combination of one or more of the following: the second routing information indicates the first user plane network element to discard the second packet when a VID carried in the second packet is different from the default VID of the first port; or the second routing information indicates the first user plane network element to remove a VID carried in the second packet and send the second packet without the VID through the first port when the VID carried in the second packet is the same as the default VID of the first port.

In a possible design, the second routing information includes the default VID of the first port and the allowed VID list of the first port. That the second routing information is used by the first user plane network element to handle a second packet includes a combination of one or more of the following: the second routing information indicates the first user plane network element to discard the second packet when the allowed VID list of the first port does not include a VID carried in the second packet; the second routing information indicates the first user plane network element to send the second packet through the first port when the allowed VID list of the first port includes a VID carried in the second packet and the VID carried in the second packet is different from the default VID of the first port; or the second routing information indicates the first user plane network element to remove a VID carried in the second packet and send the second packet without the VID through the first port when the allowed VID list of the first port includes the VID carried in the second packet and the VID carried in the second packet is the same as the default VID of the first port.

In a possible design, that a session management network element obtains VLAN information of a first port includes: The session management network element obtains VLAN information of the first terminal, where the VLAN information of the first terminal includes a combination of one or more of the following VLAN parameters: an interface mode, a S-TAG, an allowed VID list, a default VID, or an untagged VID list, and the interface mode includes an access access type, a trunk trunk type, or a hybrid hybrid type. The session management network element determines the VLAN information of the first port based on the VLAN information of the first terminal.

In a possible design, the VLAN information of the first terminal further includes a first action indication, the first action indication indicates an operation on an uplink packet sent by the first terminal and/or a downlink packet to be sent to the first terminal, and the operation includes a combination of one or more of the following:
skipping handling a VID carried in the uplink packet;
adding the default VID of the first port to the uplink packet;
skipping handling a VID carried in the downlink packet;
removing the default VID of the first port or a VID in the untagged VID list of the first port from the downlink packet;
skipping determining, based on the allowed VID list of the first port, whether to allow transmission of the uplink packet;
skipping determining, based on the allowed VID list of the first port, whether to allow transmission of the downlink packet;
determining, based on the allowed VID list of the first port, whether to allow transmission of the uplink packet;
determining, based on the allowed VID list of the first port, whether to allow transmission of the downlink packet;
skipping adding the S-TAG to the uplink packet;
skipping removing the S-TAG from the downlink packet;
adding the S-TAG to the uplink packet; or
removing the S-TAG from the downlink packet.

In a possible design, that a session management network element obtains VLAN information of a first port includes: The session management network element obtains the VLAN information of the first terminal from the first terminal, an authentication server, a data management network element, and/or a policy control function network element.

In a possible design, that the session management network element determines the VLAN information of the first port based on the VLAN information of the first terminal includes: When the VLAN information of the first terminal includes the default VID, the session management network element determines the default VID included in the VLAN information of the first terminal as the default VID of the first port; or when the VLAN information of the first terminal does not include the default VID and the VLAN information of the first terminal includes the allowed VID list, the session management network element determines a VID that meets a preset condition in the allowed VID list included in the VLAN information of the first terminal as the default VID of the first port, where the VID that meets the preset condition in the allowed VID list included in the VLAN information of the first terminal includes: the first VID in the allowed VID list included in the VLAN information of the first terminal; the last VID in the allowed VID list included in the VLAN information of the first terminal; a VID with a highest priority in the allowed VID list included in the VLAN information of the first terminal; or a VID with a lowest priority in the allowed VID list included in the VLAN information of the first terminal.

In a possible design, the method further includes: The session management network element obtains an allowed VID list of the first user plane network element and an allowed VID list of a second user plane network element. The session management network element generates third routing information based on the allowed VID list of the first user plane network element, where the third routing information is used by the first user plane network element to handle a third packet, and the third packet is a packet received by the first user plane network element from the second user plane network element. The session management network element generates fourth routing information based on the allowed VID list of the second user plane network element, where the fourth routing information is used by the first user plane network element to handle a fourth packet, and the fourth packet is a packet to be sent by the first user plane network element to the second user plane network element. The session management network element sends the third routing information and the fourth routing information to the first user plane network element.

In a possible design, the method further includes: The session management network element obtains allowed VID lists of ports corresponding to various PDU sessions on the first user plane network element and allowed VID lists of ports corresponding to various PDU sessions on the second user plane network element. The session management network element uses a union set of the allowed VID lists of the ports corresponding to the various PDU sessions on the first user plane network element as the allowed VID list of the first user plane network element. The session management network element uses a union set of the allowed VID lists of the ports corresponding to the various PDU sessions on the second user plane network element as the allowed VID list of the second user plane network element.

In a possible design, that the third routing information is used by the first user plane network element to handle a third packet includes a combination of one or more of the following: the third routing information indicates the first user plane network element to discard the third packet when the allowed VID list of the first user plane network element does not include a VID carried in the third packet; or the third routing information indicates the first user plane network element to accept the third packet when the allowed VID list of the first user plane network element includes a VID carried in the third packet.

In a possible design, that the fourth routing information indicates the first user plane network element to handle a fourth packet includes a combination of one or more of the following: the fourth routing information indicates the first user plane network element to discard the fourth packet when the allowed VID list of the second user plane network element does not include a VID carried in the fourth packet; or the fourth routing information indicates the first user plane network element to send the fourth packet when the allowed VID list of the second user plane network element includes a VID carried in the fourth packet.

In a possible design, the method further includes: The session management network element generates fifth routing information based on the allowed VID list of the first user plane network element, where the fifth routing information is used by the second user plane network element to handle a fifth packet, and the fifth packet is a packet to be sent by the second user plane network element to the first user plane network element. The session management network element generates sixth routing information based on the allowed VID list of the second user plane network element, where the sixth routing information is used by the second user plane network element to handle a sixth packet, and the sixth packet is a packet received by the second user plane network element from the first user plane network element. The session management network element sends the fifth routing information and the sixth routing information to the second user plane network element.

In a possible design, that the fifth routing information is used by the second user plane network element to handle a fifth packet includes a combination of one or more of the following: the fifth routing information indicates the second user plane network element to discard the fifth packet when the allowed VID list of the first user plane network element does not include a VID carried in the fifth packet; or the fifth routing information indicates the second user plane network element to send the fifth packet when the allowed VID list of the first user plane network element includes a VID carried in the fifth packet.

In a possible design, that the sixth routing information is used by the second user plane network element to handle a sixth packet includes a combination of one or more of the following: the sixth routing information indicates the second user plane network element to discard the sixth packet when the allowed VID list of the second user plane network element does not include a VID carried in the sixth packet; or the sixth routing information indicates the second user plane network element to accept the sixth packet when the allowed VID list of the second user plane network element includes a VID carried in the sixth packet.

In a possible design, the method further includes: The session management network element obtains VLAN information of a fourth port, where the fourth port is a port used by the first user plane network element to be connected to a data network. The session management network element generates seventh routing information and eighth routing information based on the VLAN information of the fourth port, where the seventh routing information is used by the first user plane network element to handle a seventh packet, the seventh packet is a packet received by the first user plane network element through the fourth port, the eighth routing information is used by the first user plane network element to handle an eighth packet, and the eighth packet is a packet to be sent by the first user plane network element through the fourth port. The session management network element sends the seventh routing information and the eighth routing information to the first user plane network element.

According to a second aspect, a route configuration method is provided, including: A first user plane network element receives first routing information and second routing information that are sent by a session management network element, where the first user plane network element serves a first terminal, the first routing information and second routing information are generated based on VLAN information of a first port, the first routing information is used by the first user plane network element to handle a first packet, the first packet is an uplink packet of the first terminal received by the first user plane network element through the first port, the second routing information is used by the first user plane network element to handle a second packet, the second packet is a downlink packet to be sent by the first user plane network element to the first terminal through the first port, and the first port is a port, which corresponds to an established PDU session of the first terminal, on the first user plane network element. The first user plane network element stores the first routing information and the second routing information.

Based on the foregoing technical solution, in a scenario in which a 5GLAN communicates with an external LAN, the VLAN information of the first port may reflect a networking manner and a VLAN configuration of a network in which the first terminal is located. The first routing information and the second routing information are generated based on the VLAN information of the first port. Therefore, the first user plane network element may handle the first packet based on the first routing information, and handle the second packet based on the second routing information. As a result, a manner in which the first user plane network element handles a packet may adapt to the networking manner and the VLAN configuration of the network in which the first terminal is located, to ensure normal communication of the external LAN.

In a possible design, the VLAN information of the first port includes a combination of one or more of the following: a default VID of the first port, an allowed VID list of the first port, or an untagged VID list of the first port.

In a possible design, the first routing information includes the default VID of the first port and the allowed VID list of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when the first packet carries a VID and the allowed VID list of the first port includes the VID carried in the first packet; or the first routing information indicates the first user plane network element to discard the first packet when the first packet carries a VID and the allowed VID list of the first port does not include the VID carried in the first packet.

In a possible design, the first routing information includes the default VID of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when the first packet carries a VID and the VID carried in the first packet is the same as the default VID of the first port; or the first routing information indicates the first user plane network element to discard the first packet when the first packet carries a VID and the VID carried in the first packet is different from the default VID of the first port.

In a possible design, the second routing information includes the allowed VID list of the first port and the untagged VID list of the first port. That the second routing information is used by the first user plane network element to handle a second packet includes a combination of one or more of the following: the second routing information indicates the first user plane network element to discard the second packet when the second packet carries a VID and the allowed VID list of the first port does not include the VID carried in the second packet; the second routing information indicates the first user plane network element to send the second packet through the first port when the second packet carries a VID, the allowed VID list of the first port includes the VID carried in the second packet, and the untagged VID list of the first port does not include the VID carried in the second packet; or the second routing information indicates the first user plane network element to remove a VID carried in the second packet and send the second packet without the VID through the first port when the second packet carries a VID, the allowed VID list of the first port includes the VID carried in the second packet, and the untagged VID list of the first port includes the VID carried in the second packet.

In a possible design, the second routing information includes the default VID of the first port. That the second routing information is used by the first user plane network element to handle a second packet includes a combination of one or more of the following: the second routing information indicates the first user plane network element to discard the second packet when a VID carried in the second packet is different from the default VID of the first port; or the second routing information indicates the first user plane network element to remove a VID carried in the second packet and send the second packet without the VID through the first port when the VID carried in the second packet is the same as the default VID of the first port.

In a possible design, the second routing information includes the default VID of the first port and the allowed VID list of the first port. That the second routing information is used by the first user plane network element to handle a second packet includes a combination of one or more of the following: the second routing information indicates the first user plane network element to discard the second packet when the allowed VID list of the first port does not include a VID carried in the second packet; the second routing information indicates the first user plane network element to send the second packet through the first port when the allowed VID list of the first port includes a VID carried in the second packet and the VID carried in the second packet is different from the default VID of the first port; or the second routing information indicates the first user plane network element to remove a VID carried in the second packet and send the second packet without the VID through the first port when the allowed VID list of the first port includes the VID carried in the second packet and the VID carried in the second packet is the same as the default VID of the first port.

In a possible design, the method further includes: The first user plane network element receives third routing information and fourth routing information that are sent by the session management network element, where the third routing information is generated based on an allowed VID list of the first user plane network element, the fourth routing information is generated based on an allowed VID list of a second user plane network element, the third routing information is used by the first user plane network element to handle a third packet, the third packet is a packet received by the first user plane network element from the second user plane network element, the fourth routing information is used by the first user plane network element to handle a fourth packet, and the fourth packet is a packet to be sent by the first user plane network element to the second user plane network element. The first user plane network element stores the third routing information and the fourth routing information.

In a possible design, that the third routing information is used by the first user plane network element to handle a third packet includes a combination of one or more of the following: the third routing information indicates the first user plane network element to discard the third packet when the allowed VID list of the first user plane network element does not include a VID carried in the third packet; or the third routing information indicates the first user plane network element to accept the third packet when the allowed VID list of the first user plane network element includes a VID carried in the third packet.

In a possible design, that the fourth routing information indicates the first user plane network element to handle a fourth packet includes a combination of one or more of the following: the fourth routing information indicates the first user plane network element to discard the fourth packet when the allowed VID list of the second user plane network element does not include a VID carried in the fourth packet; or the fourth routing information indicates the first user plane network element to send the fourth packet when the allowed VID list of the second user plane network element includes a VID carried in the fourth packet.

In a possible design, the method further includes: The first user plane network element receives seventh routing information and eighth routing information that are sent by the session management network element, where the seventh routing information and the eighth routing information are generated based on VLAN information of a fourth port, the fourth port is a port used by the first user plane network element to be connected to a data network, the seventh routing information is used by the first user plane network element to handle a seventh packet, the seventh packet is a packet received by the first user plane network element through the fourth port, the eighth routing information is used by the first user plane network element to handle an eighth packet, and the eighth packet is a packet to be sent by the first user plane network element through the fourth port. The first user plane network element stores the seventh routing information and the eighth routing information.

According to a third aspect, a communication apparatus is provided, including a processing unit and a communication unit. The processing unit is configured to obtain VLAN information of a first port, where the first port is a port, which corresponds to an established PDU session of a first terminal, on a first user plane network element, and the first user plane network element is a user plane network element that serves the first terminal; and generate first routing information and second routing information based on the VLAN information of the first port, where the first routing information is used by the first user plane network element to handle a first packet, the first packet is an uplink packet of the first terminal received by the first user plane network element through the first port, the second routing information is used by the first user plane network element to handle a second packet, and the second packet is a downlink packet to be sent by the first user plane network element to the first terminal through the first port. The communication unit is configured to send the first routing information and the second routing information to the first user plane network element.

In a possible design, the VLAN information of the first port includes a combination of one or more of the following: a default VID of the first port, an allowed VID list of the first port, or an untagged VID list of the first port.

In a possible design, the first routing information includes the default VID of the first port and the allowed VID list of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when the allowed VID list of the first port includes a VID carried in the first packet; or the first routing information indicates the first user plane network element to discard the first packet when the allowed VID list of the first port does not include a VID carried in the first packet.

In a possible design, the first routing information includes the default VID of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when a VID carried in the first packet is the same as the default VID of the first port; or the first routing information indicates the first user plane network element to discard the first packet when a VID carried in the first packet is different from the default VID of the first port.

In a possible design, the second routing information includes the allowed VID list of the first port and the untagged VID list of the first port. That the second routing information is used by the first user plane network element to handle a second packet includes a combination of one or more of the following: the second routing information indicates the first user plane network element to discard the second packet when the second packet carries a VID and the allowed VID list of the first port does not include the VID carried in the second packet; the second routing information indicates the first user plane network element to send the second packet through the first port when the allowed VID list of the first port includes a VID carried in the second packet and the untagged VID list of the first port does not include the VID carried in the second packet; or the second routing information indicates the first user plane network element to remove a VID carried in the second packet and send the second packet without the VID through the first port when the allowed VID list of the first port includes the VID carried in the second packet and the untagged VID list of the first port includes the VID carried in the second packet.

In a possible design, the second routing information includes the default VID of the first port. That the second routing information is used by the first user plane network element to handle a second packet includes a combination of one or more of the following: the second routing information indicates the first user plane network element to discard the second packet when a VID carried in the second packet is different from the default VID of the first port; or the second routing information indicates the first user plane network element to remove a VID carried in the second packet and send the second packet without the VID through the first port when the VID carried in the second packet is the same as the default VID of the first port.

In a possible design, the second routing information includes the default VID of the first port and the allowed VID list of the first port. That the second routing information is used by the first user plane network element to handle a second packet includes a combination of one or more of the following: the second routing information indicates the first user plane network element to discard the second packet when the allowed VID list of the first port does not include a VID carried in the second packet; the second routing information indicates the first user plane network element to send the second packet through the first port when the allowed VID list of the first port includes a VID carried in the second packet and the VID carried in the second packet is different from the default VID of the first port; or the second routing information indicates the first user plane network element to remove a VID carried in the second packet and send the second packet without the VID through the first port when the allowed VID list of the first port includes the VID carried in the second packet and the VID carried in the second packet is the same as the default VID of the first port.

In a possible design, the communication unit is further configured to obtain VLAN information of the first terminal, where the VLAN information of the first terminal includes a combination of one or more of the following VLAN parameters: an interface mode, a S-TAG, an allowed VID list, a default VID, or an untagged VID list, and the interface mode includes an access access type, a trunk trunk type, or a hybrid hybrid type. The processing unit is further configured to determine the VLAN information of the first port based on the VLAN information of the first terminal.

In a possible design, the VLAN information of the first terminal further includes a first action indication, the first action indication indicates an operation on an uplink packet sent by the first terminal and/or a downlink packet to be sent to the first terminal, and the operation includes a combination of one or more of the following:
skipping handling a VID carried in the uplink packet;
adding the default VID of the first port to the uplink packet;
skipping handling a VID carried in the downlink packet;
removing the default VID of the first port or a VID in the untagged VID list of the first port from the downlink packet;
skipping determining, based on the allowed VID list of the first port, whether to allow transmission of the uplink packet;
skipping determining, based on the allowed VID list of the first port, whether to allow transmission of the downlink packet;
determining, based on the allowed VID list of the first port, whether to allow transmission of the uplink packet;
determining, based on the allowed VID list of the first port, whether to allow transmission of the downlink packet;
skipping adding the S-TAG to the uplink packet;
skipping removing the S-TAG from the downlink packet;
adding the S-TAG to the uplink packet; or
removing the S-TAG from the downlink packet.

In a possible design, the communication unit is specifically configured to obtain the VLAN information of the first terminal from the first terminal, an authentication server, a data management network element, and/or a policy control function network element.

In a possible design, the processing unit is specifically configured to: when the VLAN information of the first terminal includes the default VID, determine the default VID included in the VLAN information of the first terminal as the default VID of the first port; or when the VLAN information of the first terminal does not include the default VID and the VLAN information of the first terminal includes the allowed VID list, determine a VID that meets a preset condition in the allowed VID list included in the VLAN information of the first terminal as the default VID of the first port, where the VID that meets the preset condition in the allowed VID list included in the VLAN information of the first terminal includes: the first VID in the allowed VID list included in the VLAN information of the first terminal; the last VID in the allowed VID list included in the VLAN information of the first terminal; a VID with a highest priority in the allowed VID list included in the VLAN information of the first terminal; or a VID with a lowest priority in the allowed VID list included in the VLAN information of the first terminal.

In a possible design, the processing unit is further configured to: obtain an allowed VID list of the first user plane network element and an allowed VID list of a second user plane network element; generate third routing information based on the allowed VID list of the first user plane network element, where the third routing information is used by the first user plane network element to handle a third packet, and the third packet is a packet received by the first user plane network element from the second user plane network element; and generate fourth routing information based on the allowed VID list of the second user plane network element, where the fourth routing information is used by the first user plane network element to handle a fourth packet, and the fourth packet is a packet to be sent by the first user plane network element to the second user plane network element. The communication unit is further configured to send the third routing information and the fourth routing information to the first user plane network element.

In a possible design, the processing unit is further configured to: obtain allowed VID lists of ports corresponding to various PDU sessions on the first user plane network element and allowed VID lists of ports corresponding to various PDU sessions on the second user plane network element; use a union set of the allowed VID lists of the ports corresponding to the various PDU sessions on the first user plane network element as the allowed VID list of the first user plane network element; and use a union set of the allowed VID lists of the ports corresponding to the various PDU sessions on the second user plane network element as the allowed VID list of the second user plane network element.

In a possible design, that the third routing information is used by the first user plane network element to handle a third packet includes a combination of one or more of the following: the third routing information indicates the first user plane network element to discard the third packet when the allowed VID list of the first user plane network element does not include a VID carried in the third packet; or the third routing information indicates the first user plane network element to accept the third packet when the allowed VID list of the first user plane network element includes a VID carried in the third packet.

In a possible design, that the fourth routing information indicates the first user plane network element to handle a fourth packet includes a combination of one or more of the following: the fourth routing information indicates the first user plane network element to discard the fourth packet when the allowed VID list of the second user plane network element does not include a VID carried in the fourth packet; or the fourth routing information indicates the first user plane network element to send the fourth packet when the allowed VID list of the second user plane network element includes a VID carried in the fourth packet.

In a possible design, the processing unit is further configured to generate fifth routing information based on the allowed VID list of the first user plane network element, where the fifth routing information is used by the second user plane network element to handle a fifth packet, and the fifth packet is a packet to be sent by the second user plane network element to the first user plane network element; and generate sixth routing information based on the allowed VID list of the second user plane network element, where the sixth routing information is used by the second user plane network element to handle a sixth packet, and the sixth packet is a packet received by the second user plane network element from the first user plane network element. The communication unit is further configured to send the fifth routing information and the sixth routing information to the second user plane network element.

In a possible design, that the fifth routing information is used by the second user plane network element to handle a fifth packet includes a combination of one or more of the following: the fifth routing information indicates the second user plane network element to discard the fifth packet when the allowed VID list of the first user plane network element does not include a VID carried in the fifth packet; or the fifth routing information indicates the second user plane network element to send the fifth packet when the allowed VID list of the first user plane network element includes a VID carried in the fifth packet.

In a possible design, that the sixth routing information is used by the second user plane network element to handle a sixth packet includes a combination of one or more of the following: the sixth routing information indicates the second user plane network element to discard the sixth packet when the allowed VID list of the second user plane network element does not include a VID carried in the sixth packet; or the sixth routing information indicates the second user plane network element to accept the sixth packet when the allowed VID list of the second user plane network element includes a VID carried in the sixth packet.

In a possible design, the processing unit is further configured to obtain VLAN information of a fourth port, where the fourth port is a port used by the first user plane network element to be connected to a data network; and generate seventh routing information and eighth routing information based on the VLAN information of the fourth port, where the seventh routing information is used by the first user plane network element to handle a seventh packet, the seventh packet is a packet received by the first user plane network element through the fourth port, the eighth routing information is used by the first user plane network element to handle an eighth packet, and the eighth packet is a packet to be sent by the first user plane network element through the fourth port. The communication unit is further configured to send the seventh routing information and the eighth routing information to the first user plane network element.

According to a fourth aspect, a communication apparatus is provided, including a processing unit and a communication unit. The communication unit is further configured to receive first routing information and second routing information that are sent by a session management network element, where the first user plane network element serves a first terminal, the first routing information and the second routing information are generated based on VLAN information of a first port, the first routing information is used by the first user plane network element to handle a first packet, the first packet is an uplink packet of the first terminal received by the first user plane network element through the first port, the second routing information is used by the first user plane network element to handle a second packet, the second packet is a downlink packet to be sent by the first user plane network element to the first terminal through the first port, and the first port is a port, which corresponds to an established PDU session of the first terminal, on the first user plane network element. The processing unit is further configured to store the first routing information and the second routing information.

In a possible design, the VLAN information of the first port includes a combination of one or more of the following: a default VID of the first port, an allowed VID list of the first port, or an untagged VID list of the first port.

In a possible design, the first routing information includes the default VID of the first port and the allowed VID list of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when the first packet carries a VID and the allowed VID list of the first port includes the VID carried in the first packet; or the first routing information indicates the first user plane network element to discard the first packet when the first packet carries a VID and the allowed VID list of the first port does not include the VID carried in the first packet.

In a possible design, the first routing information includes the default VID of the first port. That the first routing information is used by the first user plane network element to handle a first packet includes a combination of one or more of the following: the first routing information indicates the first user plane network element to add the default VID of the first port to the first packet when the first packet does not carry a VID; the first routing information indicates the first user plane network element to accept the first packet when the first packet carries a VID and the VID carried in the first packet is the same as the default VID of the first port; or the first routing information indicates the first user plane network element to discard the first packet when the first packet carries a VID and the VID carried in the first packet is different from the default VID of the first port.

In a possible design, the second routing information includes the allowed VID list of the first port and the untagged VID list of the first port. That the second routing information is used by the first user plane network element to handle a second packet includes a combination of one or more of the following: the second routing information indicates the first user plane network element to discard the second packet when the second packet carries a VID and the allowed VID list of the first port does not include the VID carried in the second packet; the second routing information indicates the first user plane network element to send the second packet through the first port when the second packet carries a VID, the allowed VID list of the first port includes the VID carried in the second packet, and the untagged VID list of the first port does not include the VID carried in the second packet; or the second routing information indicates the first user plane network element to remove a VID carried in the second packet and send the second packet without the VID through the first port when the second packet carries a VID, the allowed VID list of the first port includes the VID carried in the second packet, and the untagged VID list of the first port includes the VID carried in the second packet.

In a possible design, the second routing information includes the default VID of the first port. That the second routing information is used by the first user plane network element to handle a second packet includes a combination of one or more of the following: the second routing information indicates the first user plane network element to discard the second packet when a VID carried in the second packet is different from the default VID of the first port; or the second routing information indicates the first user plane network element to remove a VID carried in the second packet and send the second packet without the VID through the first port when the VID carried in the second packet is the same as the default VID of the first port.

In a possible design, the second routing information includes the default VID of the first port and the allowed VID list of the first port. That the second routing information is used by the first user plane network element to handle a second packet includes a combination of one or more of the following: the second routing information indicates the first user plane network element to discard the second packet when the allowed VID list of the first port does not include a VID carried in the second packet; the second routing information indicates the first user plane network element to send the second packet through the first port when the allowed VID list of the first port includes a VID carried in the second packet and the VID carried in the second packet is different from the default VID of the first port; or the second routing information indicates the first user plane network element to remove a VID carried in the second packet and send the second packet without the VID through the first port when the allowed VID list of the first port includes the VID carried in the second packet and the VID carried in the second packet is the same as the default VID of the first port.

In a possible design, the communication unit is further configured to receive third routing information and fourth routing information that are sent by the session management network element, where the third routing information is generated based on an allowed VID list of the first user plane network element, the fourth routing information is generated based on an allowed VID list of a second user plane network element, the third routing information is used by the first user plane network element to handle a third packet, the third packet is a packet received by the first user plane network element from the second user plane network element, the fourth routing information is used by the first user plane network element to handle a fourth packet, and the fourth packet is a packet to be sent by the first user plane network element to the second user plane network element. The processing unit is further configured to store the third routing information and the fourth routing information.

In a possible design, that the third routing information is used by the first user plane network element to handle a third packet includes a combination of one or more of the following: the third routing information indicates the first user plane network element to discard the third packet when the allowed VID list of the first user plane network element does not include a VID carried in the third packet; or the third routing information indicates the first user plane network element to accept the third packet when the allowed VID list of the first user plane network element includes a VID carried in the third packet.

In a possible design, that the fourth routing information indicates the first user plane network element to handle a fourth packet includes a combination of one or more of the following: the fourth routing information indicates the first user plane network element to discard the fourth packet when the allowed VID list of the second user plane network element does not include a VID carried in the fourth packet; or the fourth routing information indicates the first user plane network element to send the fourth packet when the allowed VID list of the second user plane network element includes a VID carried in the fourth packet.

In a possible design, the communication unit is further configured to receive seventh routing information and eighth routing information that are sent by the session management network element, where the seventh routing information and the eighth routing information are generated based on VLAN information of a fourth port, the fourth port is a port used by the first user plane network element to be connected to a data network, the seventh routing information is used by the first user plane network element to handle a seventh packet, the seventh packet is a packet received by the first user plane network element through the fourth port, the eighth routing information is used by the first user plane network element to handle an eighth packet, and the eighth packet is a packet to be sent by the first user plane network element through the fourth port. The processing unit is further configured to store the seventh routing information and the eighth routing information.

According to a fifth aspect, a communication apparatus is provided. The communication apparatus includes a processor and a communication interface. The processor is configured to execute computer program instructions, so that the communication apparatus implements the route configuration method in any design provided in the first aspect or the second aspect.

According to a sixth aspect, a computer-readable storage medium is provided. The computer-readable storage medium stores instructions. When the instructions are run on a computer, the computer is enabled to implement the route configuration method in any design provided in the first aspect or the second aspect.

According to a seventh aspect, a computer program product is provided. The computer program product includes instructions. When the computer program product runs on a computer, the computer is enabled to implement the route configuration method in any design provided in the first aspect or the second aspect.

According to an eighth aspect, a chip is provided. The chip includes a processor. When the processor executes computer program instructions, a computer is enabled to implement the route configuration method in any design provided in the first aspect or the second aspect.

According to a ninth aspect, a communication system is provided, including a session management network element and a first user plane network element. The session management network element is configured to perform the route configuration method in any design provided in the first aspect. The first user plane network element is configured to perform the route configuration method in any design provided in the second aspect.

For technical effects brought by any design manner in the third aspect to the ninth aspect, refer to the technical effects in the corresponding method provided above, which are the same as the technical effects brought by the design manner. Details are not described herein again.

DETAILED DESCRIPTION OF ILLUSTRATIVE EMBODIMENTS

Figure 1:
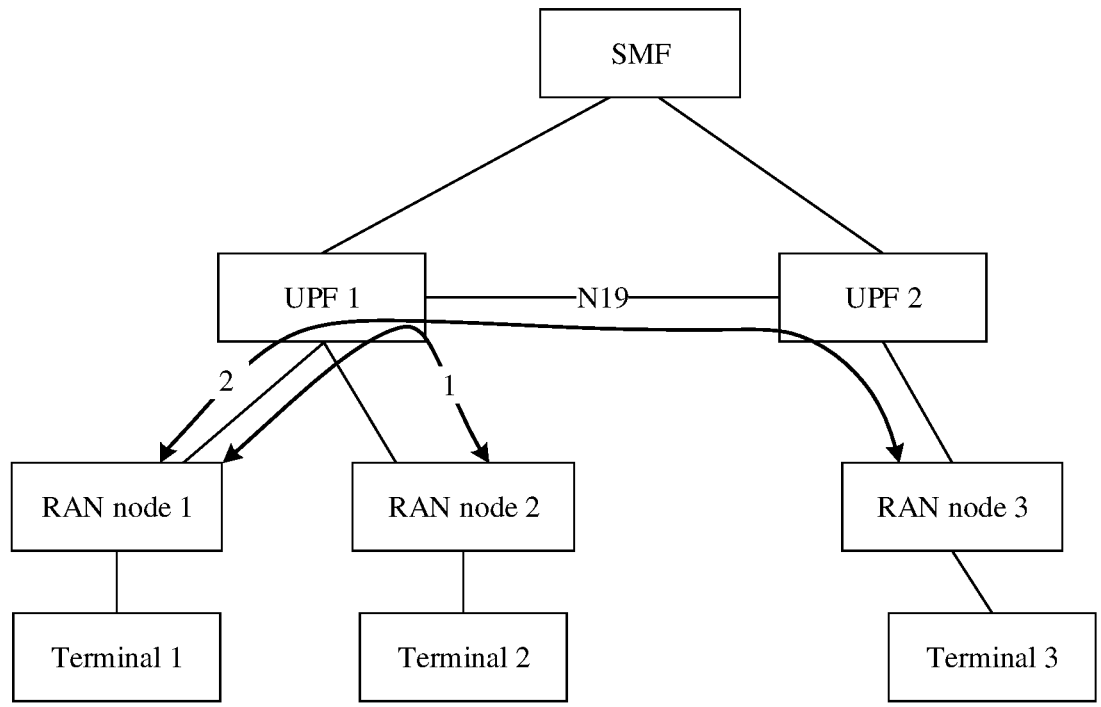
FIG. 1 is a schematic diagram of a system architecture of a 5GLAN.

In descriptions of this application, unless otherwise specified, "/" means "or". For example, A/B may represent A or B. A term "and/or" in this specification describes only an association relationship between associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Specifically, use of the word "example", "for example", or the like is intended to present a related concept in a specific manner.

To facilitate understanding of the technical solutions in this application, the following first briefly describes technical terms in this application.

1. Protocol Data Unit (PDU) Session

A 5G core network supports a PDU connection service, and the PDU connection service is a service of exchanging a PDU data packet between a terminal and a data network (DN). The PDU connection service is implemented by initiating PDU session establishment by the terminal. The terminal establishes a PDU session, in other words, establishes a data transmission channel between the terminal and the DN.

It should be noted that the terminal may initiate establishment of one or more PDU sessions to be connected to a same DN or different DNs. The terminal may be served by a group of core network elements (such as a session management function (SMF) network element, a policy control function (PCF) network element, and a user plane function (UPF) network element). These core network elements coordinate and manage PDU session resources of the terminal.

2. N4 Session

The N4 session is created by an SMF on a UPF to manage a function of the UPF that serves a PDU session. For example, when the terminal establishes a PDU session, the SMF may indicate the UPF to create an N4 session corresponding to the PDU session. When the SMF receives a PDU session deletion request, the SMF triggers the UPF to delete the N4 session corresponding to the PDU session. In some cases, the SMF may further trigger the UPF to modify the N4 session corresponding to the PDU session.

In embodiments of this application, N4 sessions may be classified into a user-level (or terminal-level) N4 session and a group-level N4 session.

In a process of creating the N4 session, both the SMF and the UPF generate an N4 session context to store parameters related to the N4 session. The N4 session context may include an N4 session ID, and N4 routing rules used for the N4 session, including a packet detection rule (PDR), a forwarding action rule (FAR), a quality of service (QoS) enforcement rule (QER), and a usage reporting rule (URR).

The UPF uses parameters such as the PDR, the FAR, the QER, and the URR in the N4 session context to detect and forward a packet of the PDU session.

For example, after the UPF receives a packet from an ingress, the UPF determines, by using a PDR, an N4 session to which the packet belongs. Then, the UPF performs matching between a PDR (which may be one or more PDRs) in the N4 session context and characteristic information of the packet, to find a PDR that matches the packet. The PDR is associated with or specifies a FAR, a QER, and a URR corresponding to the packet. Therefore, the UPF may drop the packet, forward the packet, buffer the packet, notify a control plane of the packet, duplicate the packet, or the like according to the FAR. The UPF may perform a QoS operation on the packet according to the QER. The UPF network element may perform usage reporting on the packet according to the URR.

3. Tunnel

In embodiments of this application, tunnels may be classified into the following two types: (1) A tunnel between an access network device and a UPF. The tunnel between the access network device and the UPF may have another name, for example, a next generation (next generation, N) 3 interface (N3 for short) tunnel. (2) A tunnel between two UPFs. The tunnel between the two UPFs may have another name, for example, an N19 tunnel.

It should be noted that the tunnel may be a tunnel at a session granularity, a tunnel at a device granularity, or a tunnel at a group granularity.

The tunnel at the session granularity is a tunnel used only for one PDU session. The tunnel at the session granularity is used to transmit only a data packet of a corresponding PDU session.

The tunnel at the device granularity is a unique tunnel established between two devices (for example, a RAN node and a UPF). The tunnel is used to transmit data of all terminals served by the two devices.

The tunnel at the group granularity is a tunnel used by all terminals in one group. The tunnel at the group granularity is used to transmit only a data packet of a terminal in a corresponding group.

4. Ethernet Frame

The Ethernet frame is a data packet transmitted on an Ethernet link. Ethernet frames are classified into a tagged frame and an untagged frame. The tagged frame carries a 4-byte VLAN tag. The untagged frame does not carry a VLAN tag.

The VLAN tag usually includes a 2-byte tag protocol identifier (TPID) and a 2-byte tag control information (TCI).

The TPID is a type defined by the IEEE, and indicates that a frame carrying the TPID is a frame to which a tag is added.

The TCI includes the following parameters: a priority (priority), a canonical format indicator (CFI), and a VLAN identifier (VID).

In embodiments of this application, handling a VID of the Ethernet frame may be replaced with handling a VLAN tag of the Ethernet frame. For example, adding a VID to the Ethernet frame may be replaced with adding a VLAN tag to the Ethernet frame. For another example, removing a VID carried in the Ethernet frame may be replaced with removing a VLAN tag carried in the Ethernet frame.

In embodiments of this application, the Ethernet frame may be replaced with a packet or a data packet.

5. Port of a Fixed Network

To adapt to different connection manners and networking manners, the fixed network introduces an access port, a trunk port, and a hybrid port.

The access port is usually used to be connected to a user terminal that cannot identify a tag, for example, a user host or a server. The access port can belong to only one VLAN. A default VID is configured for the access port.

The trunk port is usually used to be connected to a device that can identify a tag, for example, a switch, a router, an access point (AP), and a voice terminal that may send and receive a tagged frame and an untagged frame. The trunk port can belong to a plurality of VLANs. A default VID and a tag list are configured for the trunk port.

The hybrid port may be used to be connected to both a user terminal that cannot identify a tag and a device that can identify a tag. The hybrid port can belong to a plurality of VLANs. A default VID, a tag list, and an untagged list are configured for the hybrid port.

For example, for manners in which the foregoing three ports handles a packet, refer to Table 1.

The foregoing describes terms used in embodiments of this application. General descriptions are provided herein, and details are not described below again.

For a 5GLAN service, 3rd generation partnership project (3GPP) technical rule (TR) 23.734 proposes to support one-to-one communication and one-to-many communication in a 5GLAN. Specifically, to support one-to-one communication and one-to-many communication in the 5GLAN, a 3GPP network is required to support group-based unicast,

TABLE 1

|  | Access port | Trunk port | Hybrid port |
| --- | --- | --- | --- |
| Processing of a received packet that does not carry a VID | The packet is accepted and a default VID is added to the packet | A default VID is added to the packet. In addition, when the default VID is in a tag list, the packet is accepted; when the default VID is not in a tag list, the packet is discarded | A default VID is added to the packet. In addition, when the default VID is in a tag list, the packet is accepted; when the default VID is not in a tag list, the packet is discarded |
| Processing of a received packet that carries the VID | When the VID carried in the packet is the same as the default VID, the packet is accepted; when the VID carried in the packet is different from the default VID, the packet is discarded | When the VID carried in the packet is in the tag list, the packet is accepted; when the VID carried in the packet is not in the tag list, the packet is discarded | When the VID carried in the packet is in the tag list, the packet is accepted; when the VID carried in the packet is not in the tag list, the packet is discarded |
| Processing of a to-be-sent packet | The VID carried in the packet is removed and the packet without the VID is sent | When the VID carried in the packet is the same as the default VID and the VID carried in the packet is in the tag list, the VID carried in the packet is removed and the packet without the VID is sent; when the VID carried in the packet is different from the default VID and the VID carried in the packet is in the tag list, the packet is sent; when the VID carried in the packet is not in the tag list, the packet is discarded | When the VID carried in the packet is in the tag list but not in an untagged list, the packet is sent; when the VID carried in the packet is in the tag list and an untagged list, the VID carried in the packet is removed and the packet without the VID is sent; when the VID carried in the packet is not in the tag list, the packet is discarded |

6. QinQ Technology

In a VLAN tag defined in the IEEE802.1Q, only 12 bits indicate a VID. Therefore, a device may support a maximum of 4094 VLANs. During actual application, especially in a metropolitan area network, a large quantity of VLANs are required to isolate users. 4094 VLANs cannot meet a requirement. To expand quantity space of VLANs, the QinQ technology is proposed in the industry. The QinQ technology is to add another 802.1Q tag to a packet with an 802.1Q tag. A packet using the QinQ technology may be referred to as a QinQ packet for short. The QinQ packet may include two VLAN tags. An inner VLAN tag is a customer tag (C-tag), and an outer VLAN tag is a service provider tag (S-tag).

In embodiments of this application, the default VID may have another name, for example, a default VID or a port default VID (port default VLAN ID, PVID). This is not limited herein.

multicast, and broadcast, support duplication and distribution of multicast and broadcast packets, and support any terminal as a multicast source.

To meet this requirement, it is currently defined in 3GPP technical standard (TS) 23.501 that one 5GLAN is managed by one SMF. As shown in FIG. 1, the SMF manages one UPF or simultaneously manages a plurality of UPFs. FIG. 1 is drawn by using an example in which the SMF manages a UPF 1 and a UPF 2. The UPF 1 and the UPF 2 maintain routing rules. The UPF 1 and the UPF 2 may perform packet forwarding according to the routing rules maintained by the UPF 1 and the UPF 2. It is assumed that a terminal 1, a terminal 2, and a terminal 3 belong to a same group. When two terminals (for example, the terminal 1 and the terminal 2 in FIG. 1) served by a same UPF perform one-to-one communication, data is transmitted through local switch (local switch) of the UPF. When two terminals (for example, the terminal 1 and the terminal 3 in FIG. 1) served by different UPFs perform one-to-one communication, data needs to be transmitted through a tunnel between the UPF 1 and the UPF 2.

In embodiments of this application, two UPFs may exchange tunnel information through an SMF, to establish a tunnel. A tunnel (or a forwarding path) corresponding to tunnel information of a UPF network element may be constructed in a manner of a virtual local area network (VLAN), a virtual extensible local area network (VxLAN), a general packet radio service (GPRS) tunneling protocol-user plane (GTP-U), a generic routing encapsulation (GRE) protocol, or an IP tunnel. The foregoing construction manner may be dynamic, or may be pre-configured in a network. This is not specifically limited in embodiments of this application.

Different construction manners correspond to different tunnel information. For example, when the VLAN is used for construction, the tunnel information may be a UPF ID, a UPF ID+a virtual local area network identifier (VLAN ID, VID), or media access control (media access control, MAC)+a VID. Alternatively, for example, when the VxLAN is used for construction, the tunnel information may be a UPF ID, a UPF ID+a VID, an IP address+a VID, or an IP address+a port number+a VID. Alternatively, for example, when the GTP-U is used for construction, the tunnel information may be a UPF ID, a UPF ID+a tunnel endpoint identifier (TEID), an IP address+a TEID, or an IP address+a port+a TEID. Alternatively, for example, when the GRE is used for construction, the tunnel information may be a UPF ID, a UPF ID+a key (key), an IP address+a key, or an IP address+a port+a key. Alternatively, when the IP tunnel is used for construction, the tunnel information may be a UPF ID, an IP address, or an IP address+a port. If the tunnel information includes the UPF ID, the UPF ID may be a MAC address or an IP address, or an IP address+a port, or the SMF network element or the UPF network element may determine a corresponding MAC address or IP address, or an IP address+a port based on the UPF ID. General descriptions are provided herein, and details are not described below again.

In embodiments of this application, one 5GLAN may provide a group communication service for one group. In other words, one 5GLAN may correspond to one group. One SMF or UPF may also provide communication services for a plurality of groups.

Optionally, in terms of expression, the 5GLAN may also be referred to as a 5G virtual network (5GVN), a local area network (LAN), a 5G LAN-VN LAN group, a LAN-type service, a LAN-VN, a 5G LAN-type service, or the like. A name of the 5GLAN is not specifically limited in embodiments of this application.

In an architecture shown in FIG. 1, the SMF is mainly responsible for all control plane functions of terminal session management, including UPF selection and control, IP address allocation and management, session quality of service (QoS) management, a function of obtaining a policy and charging control (PCC) policy from a PCF, and the like.

In the architecture shown in FIG. 1, the UPF serves as an anchor of a PDU session connection, and is responsible for data packet filtering, data transmission/forwarding, rate control, charging information generation, QoS handling for a user plane, uplink transmission authentication, transmission class verification, downlink data packet buffering, downlink data notification triggering, and the like of the terminal.

In the architecture shown in FIG. 1, a radio access network (RAN) is a RAN node, and the RAN node may also be referred to as an access network device. For example, the RAN node may be a transmission reception point (TRP), a base station, or a control node in various forms (for example, a network controller or a radio controller (for example, a radio controller in a cloud radio access network (CRAN) scenario)). Specifically, the RAN node may be a macro base station, a micro base station (also referred to as a small cell), a relay station, an access point (AP), or the like in various forms, or may be an antenna panel of a base station. The control node may be connected to a plurality of base stations, and configure resources for a plurality of terminals within coverage of the plurality of base stations. In systems using different radio access technologies, names of devices having functions of a base station may be different. For example, the device may be referred to as an evolved NodeB (eNB or eNodeB) in a long term evolution (LTE) system, or may be referred to as a next generation NodeB (gNB) in a 5G system or an NR system. A specific name of the base station is not limited in this application. The RAN node may alternatively be a network device in a future evolved public land mobile network (PLMN) or the like.

In the architecture shown in FIG. 1, the terminal is a user-side entity configured to receive a signal and/or send a signal. The terminal is configured to provide a user with one or more of a voice service and a data connectivity service. The terminal may also be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a vehicle-to-everything (V2X) device, for example, a smart car (smart car or intelligent car), a digital car, an unmanned car (unmanned car, driverless car, pilotless car, or automobile), a self-driving car (self-driving car or autonomous car), a pure electric vehicle (pure EV or Battery EV), a hybrid electric vehicle (HEV), a range extended electric vehicle (range extended EV, REEV), a plug-in hybrid electric vehicle (plug-in HEV, PHEV), a new energy vehicle (new energy vehicle), or a road side unit (RSU). Alternatively, the terminal may be a device-to-device (D2D) device, for example, an electricity meter or a water meter. Alternatively, the terminal may be a mobile station (MS), a subscriber unit, an uncrewed aerial vehicle, an internet of things (IoT) device, a station (ST) in a WLAN, a cellular phone, a smartphone, a cordless telephone set, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

Figure 2:
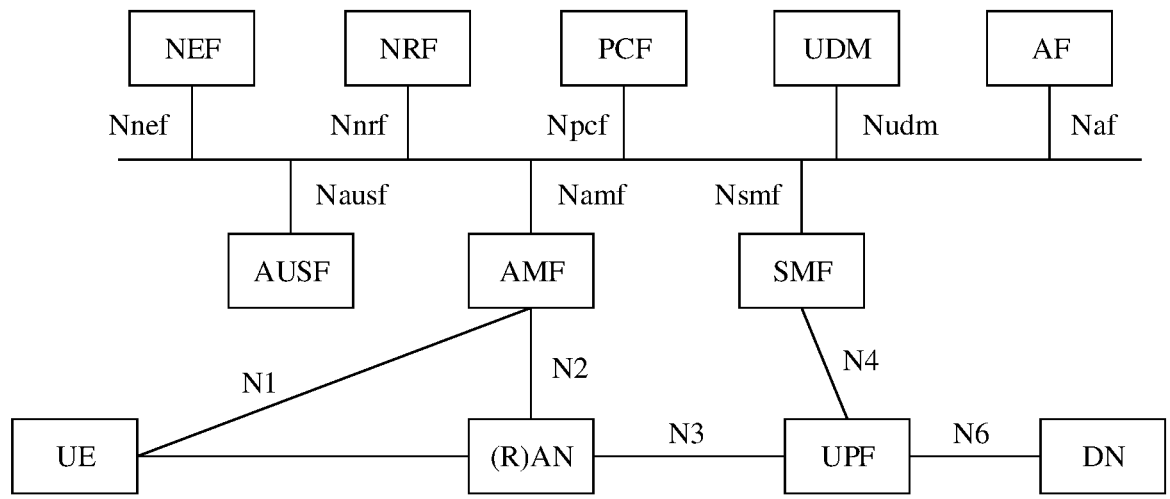
FIG. 2 is a schematic diagram of an architecture of a 5G network according to an embodiment of this application.

Optionally, as shown in FIG. 2, a current 5G network may further include the following network elements: an access and mobility management function (AMF) network element, an authentication server function (AUSF) network element, a network slice selection function (NSSF) network element, a network exposure function (NEF) network element, a network repository function (NRF) network element, a policy control function (PCF) network element, a unified data management (UDM) network element, an application function (AF) network element, and the like. This is not specifically limited in embodiments of this application.

The terminal communicates with the AMF network element through a next generation (N) 1 interface (N1 for short), the RAN device communicates with the AMF network element through an N2 interface (N2 for short), the RAN device communicates with the UPF network element through an N3 interface (N3 for short), and the UPF network element communicates with the DN through an N6 interface (N6 for short).

Control plane network elements such as the AMF network element, the SMF network element, the UDM network element, the AUSF network element, or the PCF network element may alternatively interact with each other through a service-oriented interface. For example, as shown in FIG. 2, a service-oriented interface externally provided by the AMF may be Namf, a service-oriented interface externally provided by the SMF network element may be Nsmf, a service-oriented interface externally provided by the UDM network element may be Nudm, a service-oriented interface externally provided by the PCF network element may be Npcf, and a service-oriented interface externally provided by the AUSF network element may be Nausf. Details are not described herein.

Figure 3:
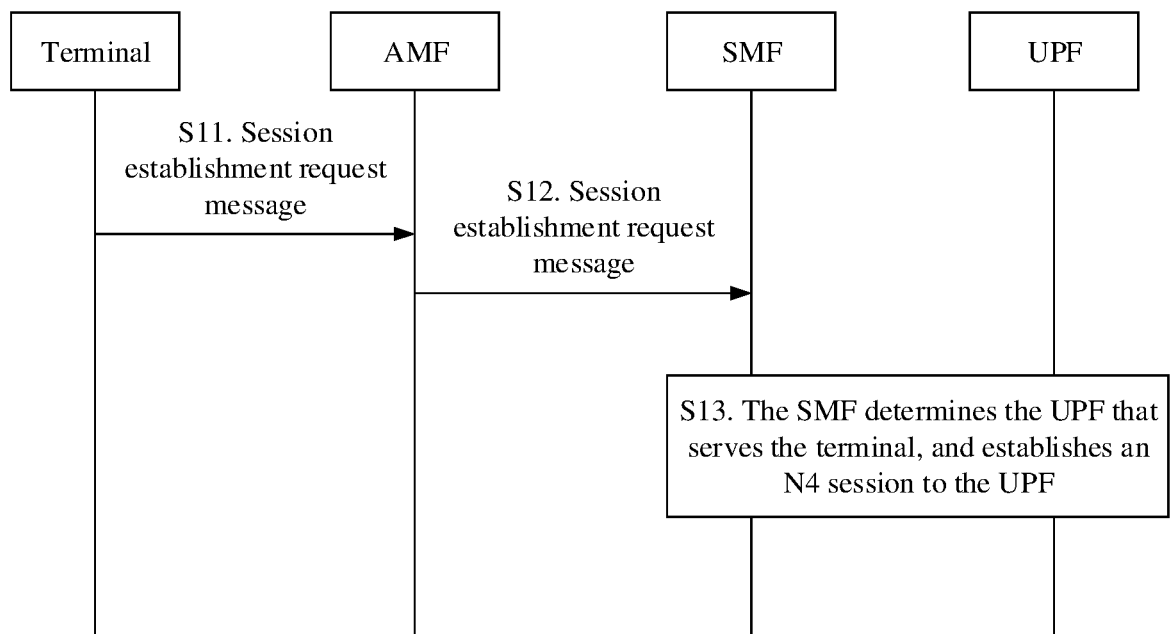
FIG. 3 is a schematic flowchart in which a terminal establishes a session to access a 5GVN service.

FIG. 3 shows a procedure in which a terminal establishes a PDU session to access a 5GLAN service. The procedure includes the following steps.

S11. The terminal sends a session establishment request message to an AMF, so that the AMF receives the session establishment request message sent by the terminal.

The session establishment request message is used to request to establish a PDU session. The session establishment request includes an identifier of the terminal and a group identifier.

In this embodiment of this application, the identifier of the terminal in the session establishment request message may include one or more of the following: a subscription permanent identifier (SUPI), a generic public subscription identifier (GPSI), an international mobile subscriber identity (IMSI), a mobile subscriber integrated services digital network (MSISDN), a globally unique temporary identity (GUTI), and a data network-related identifier (for example, a network access identifier (NAI), a specific user identifier of a local area network, an internet protocol version 4 (IPv4) address, an internet protocol version 6 (IPv6) address, a MAC address, or a MAC address+a VID).

In this embodiment of this application, the group identifier is used to determine a corresponding 5GLAN group. For example, the group identifier may be a data network name (DNN), a group identifier (Group ID), or a DNN+single network slice selection assistance information (S-NSSAI).

S12. The AMF sends the session establishment request message to an SMF, so that the SMF receives the session establishment request message sent by the AMF.

S13. The SMF determines a UPF that serves the terminal, and establishes an N4 session on the UPF.

In this way, the N4 session established by the UPF stores a corresponding N4 routing rule, so that the UPF may forward a group packet according to the N4 routing rule.

Figure 4:
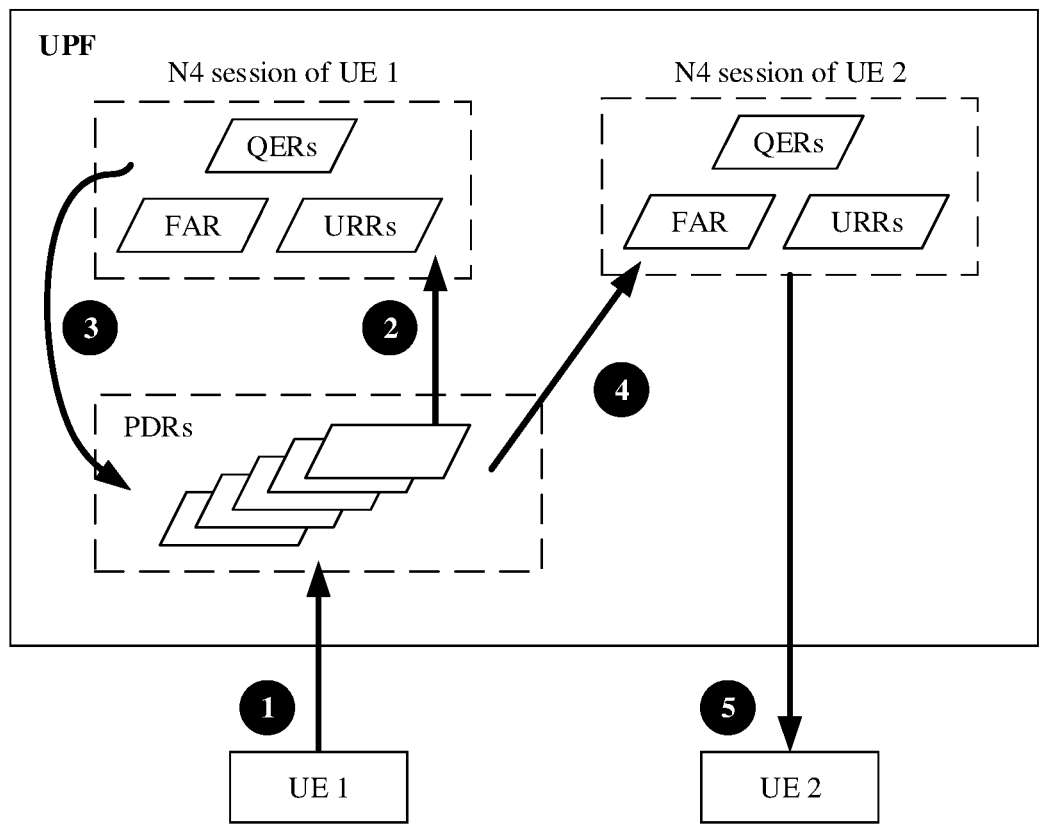
FIG. 4 is a flowchart in which a UPF performs local switching transmission in a conventional technology.

FIG. 4 shows a procedure of transmitting, in a local switch manner, a packet sent by UE 1 to UE 2 in a same group in a conventional technology. The procedure specifically includes the following steps.

1. A UPF receives, through an uplink tunnel of a session corresponding to the UE 1, a data packet sent by the UE 1 to the UE 2.

2. The UPF finds a PDR that matches the data packet in an N4 session corresponding to the UE 1. A destination interface parameter of a FAR associated with the PDR found by the UPF for the first time is set to a value of an internal interface (for example, "5GLAN internal"), and a network instance is set to an identifier of a group to which the UE 1 belongs.

3. The UPF sends, to the internal interface according to the FAR associated with the PDR found for the first time, the data packet from which an outer GTP-U header is removed.

4. The UPF performs matching on a corresponding PDR based on a destination address of the data packet (that is, an address of the UE 2) and a source interface of "5GLAN internal", and identifies an N4 session corresponding to the UE 2. A destination interface parameter of a FAR associated with the PDR found by the UPF for the second time is set to tunnel information of an access network device connected to the UE 2.

5. The UPF adds an outer header to the data packet according to the FAR associated with the PDR found for the second time, and sends, through a corresponding downlink tunnel, the data packet to the access network device accessed by the UE 2, and the access network device sends the data packet to the UE 2.

Figure 5:
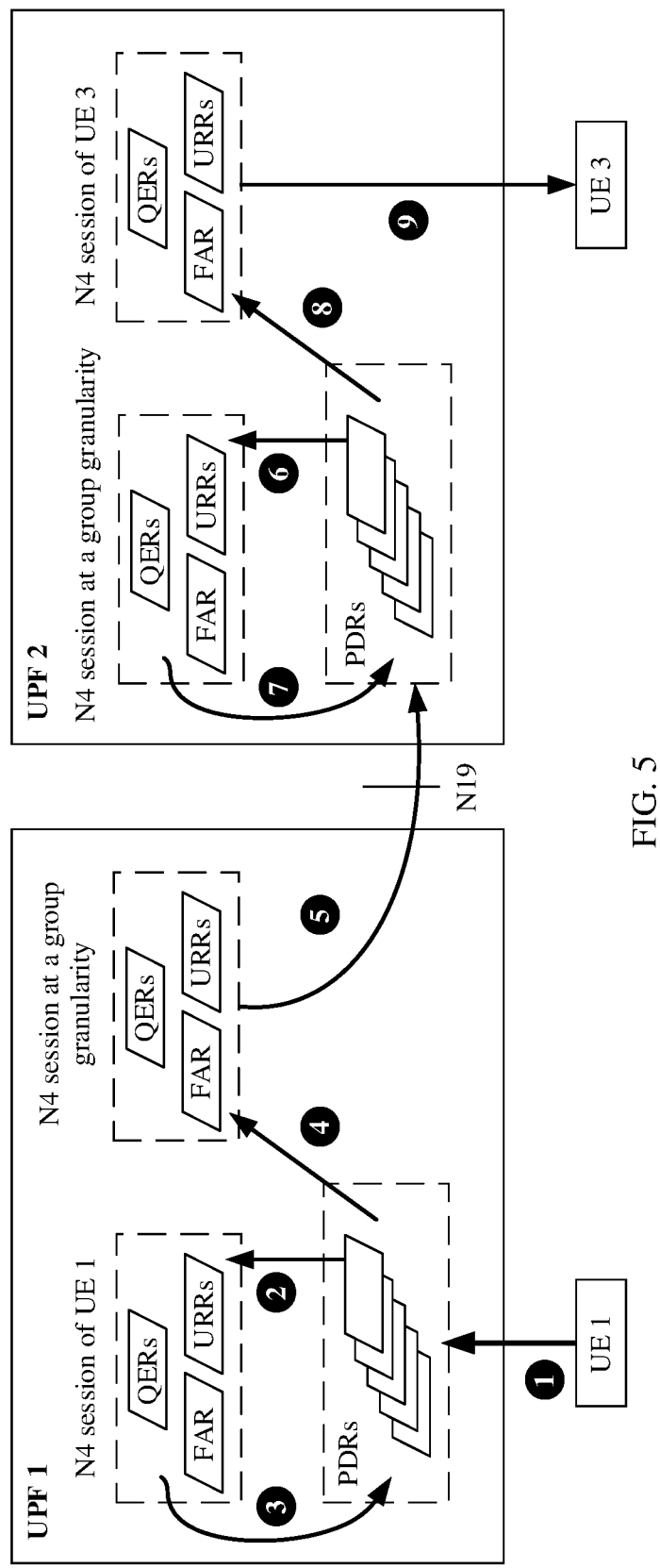
FIG. 5 is a flowchart of cross-UPF transmission in a conventional technology.

FIG. 5 shows a procedure in which a packet sent by UE 1 to UE 3 in a group is transmitted across UPFs in a conventional technology. The procedure specifically includes the following steps.

1. A UPF 1 receives, through an uplink tunnel of a session corresponding to the UE 1, a data packet sent by the UE 1 to UE 2.

2. The UPF 1 finds a PDR that matches the data packet in an N4 session corresponding to the UE 1. A destination interface parameter of a FAR associated with the PDR found by the UPF 1 for the first time is set to "5GLAN internal", and a network instance is set to an identifier of a group to which the UE 1 belongs.

3. The UPF 1 sends, to an internal interface according to the FAR associated with the PDR found for the first time, the data packet from which an outer header is removed.

4. The UPF 1 performs matching on a corresponding PDR based on a destination address of the data packet (that is, an address of the UE 3) and a source interface of "5GLAN internal", and identifies an N4 session at a group granularity. A destination interface parameter of a FAR associated with the PDR found by the UPF 1 for the second time is set to N19 tunnel information of a UPF 2.

5. The UPF 1 encapsulates the N19 tunnel information of the UPF 2 into the data packet according to the FAR associated with the PDR found for the second time, and sends the data packet to the UPF 2.

6. After receiving the data packet through an N19 tunnel, the UPF 2 performs matching on a corresponding PDR based on a header carrying the N19 tunnel information and/or a network instance, and identifies an N4 session at a group granularity. A destination interface parameter of a FAR associated with the PDR found by the UPF 2 for the first time is set to "5GLAN internal", and the network instance is set to an identifier of a group to which the UE 3 belongs.

7. The UPF 2 removes an outer header of the data packet according to the FAR associated with the PDR found for the first time, and sends the data packet to an internal interface.

8. The UPF 2 performs matching on a corresponding PDR based on the destination address of the data packet (that is, the address of the UE 3) and the source interface of "5GLAN internal", and identifies an N4 session corresponding to the UE 3. A destination interface parameter of a FAR associated with the PDR found by the UPF 2 for the second time is set to tunnel information of an access network device connected to the UE 3.

9. The UPF 2 adds an outer header to the data packet according to the FAR associated with the PDR found for the second time, and sends, through a corresponding downlink tunnel, the data packet to the access network device accessed by the UE 3, and the access network device sends the data packet to the UE 3.

A 5GLAN may support one or more VLANs. Correspondingly, a member in a 5GLAN group may be a terminal in one or more VLANs. After a terminal accesses the 5GLAN by establishing a PDU session, the PDU session between the terminal and a UPF may be considered as a link between switches, so that the 5GLAN communicates with a VLAN to which the terminal belongs. An Ethernet packet of the VLAN to which the terminal belongs may be transmitted in the 5GLAN.

However, different terminals in the 5GLAN have different VLAN capabilities (for example, some terminals can support only an untagged frame while some terminals can support a tagged frame), and different terminals have different networking manners. Currently, a user plane network element in the 5GLAN does not perform corresponding handling on an Ethernet packet based on a terminal-side VLAN capability and networking manner, but directly forwards the Ethernet packet. Consequently, communication of an external LAN is affected.

Figure 6:
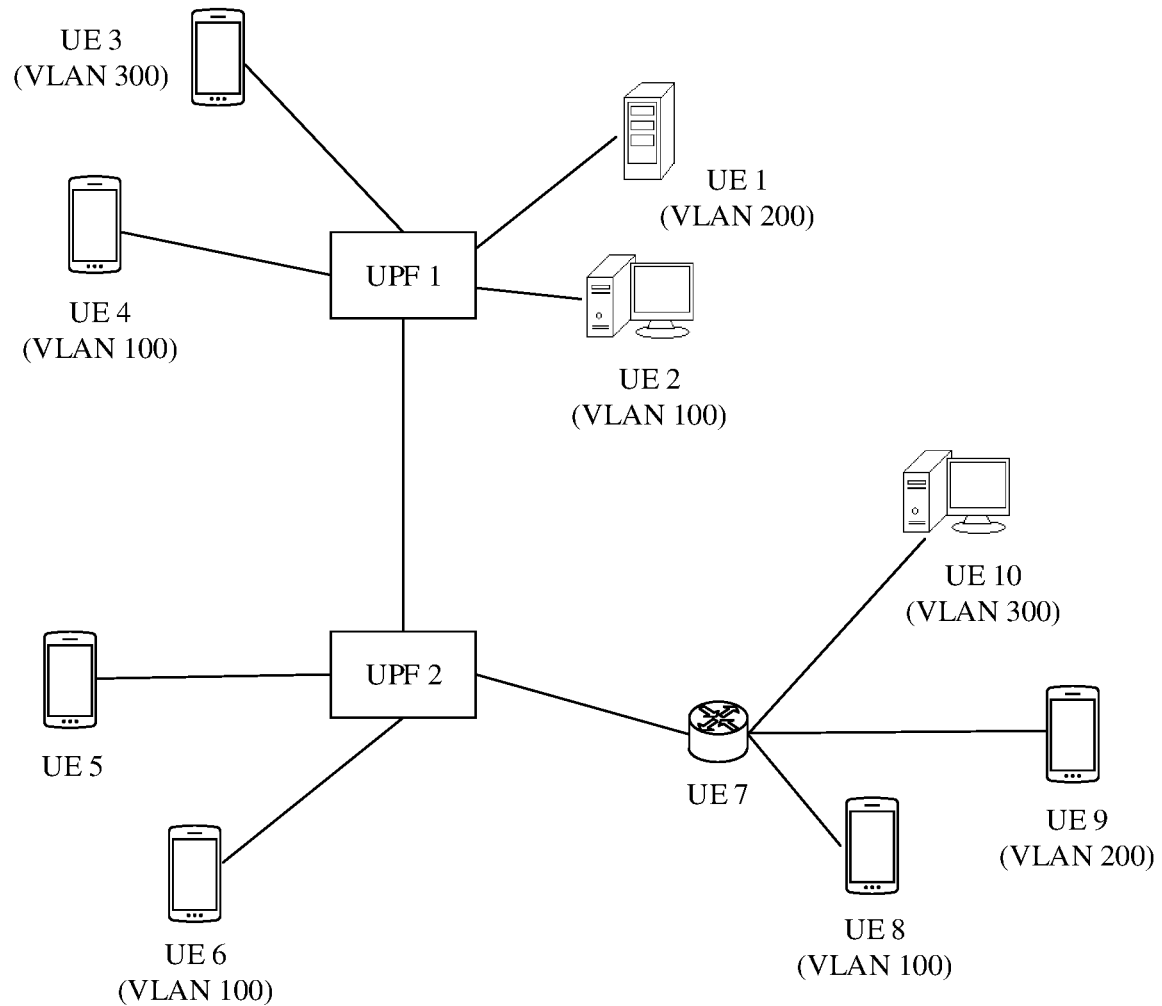
FIG. 6 is a schematic diagram of a scenario in which a 5GLAN communicates with an external LAN.

An example is used for description with reference to FIG. 6. In FIG. 6, a UPF 1 is connected to UE 1 and UE 2 in a data network, the UE 1 belongs to a VLAN 200, and the UE 2 belongs to a VLAN 100. A UPF 1 further serves UE 3 and UE 4 in a 5GLAN group. The UE 3 belongs to a VLAN 300, and the UE 4 belongs to the VLAN 100. The UPF 2 serves UE 5, UE 6, and UE 7 in the 5GLAN group, and the UE 6 belongs to the VLAN 100. The UE 7 is further connected to UE 8, UE 9, and UE 10. The UE 8 belongs to the VLAN 100, the UE9 belongs to the VLAN 200, and the UE 10 belongs to the VLAN 300.

It is assumed that the UE 7 has a capability of reading a packet carrying a VLAN tag, and the UE 4 and the UE 3 do not have the capability of reading the packet carrying the VLAN tag. The UE 7 sends a packet carrying a VLAN tag, and a destination MAC address of the packet carrying the VLAN 100 tag is a MAC address of the UE 4. Based on an existing procedure, after receiving the packet carrying the VLAN 100 tag, the UPF 2 sends the packet carrying the VLAN tag to the UPF 1. Then, the UPF 2 sends the packet carrying the VLAN 100 tag to the UE 4. Because the UE 4 does not have a capability of reading the packet carrying the VLAN 100 tag, the UE 4 discards the packet carrying the VLAN 100 tag. Consequently, communication of the VLAN 100 is affected.

For another example, the UE 3 belongs to the VLAN 300, the UE 3 sends a packet to the UPF 1, and a destination MAC address of the packet is a MAC address or a broadcast address of the UE 4. Based on an existing procedure, after receiving the packet, the UPF 1 forwards the packet to the UE 4 based on the destination address. As a result, the UE 4 belonging to the VLAN 100 incorrectly receives the packet, and communication of the VLAN 100 or the VLAN 300 is affected.

Therefore, how to enable a network element in a 5GLAN to adapt to a terminal-side VLAN capability and networking manner, so that the network element in the 5GLAN may normally transmit an Ethernet packet of a terminal is an urgent technical problem to be resolved.

Figure 7:
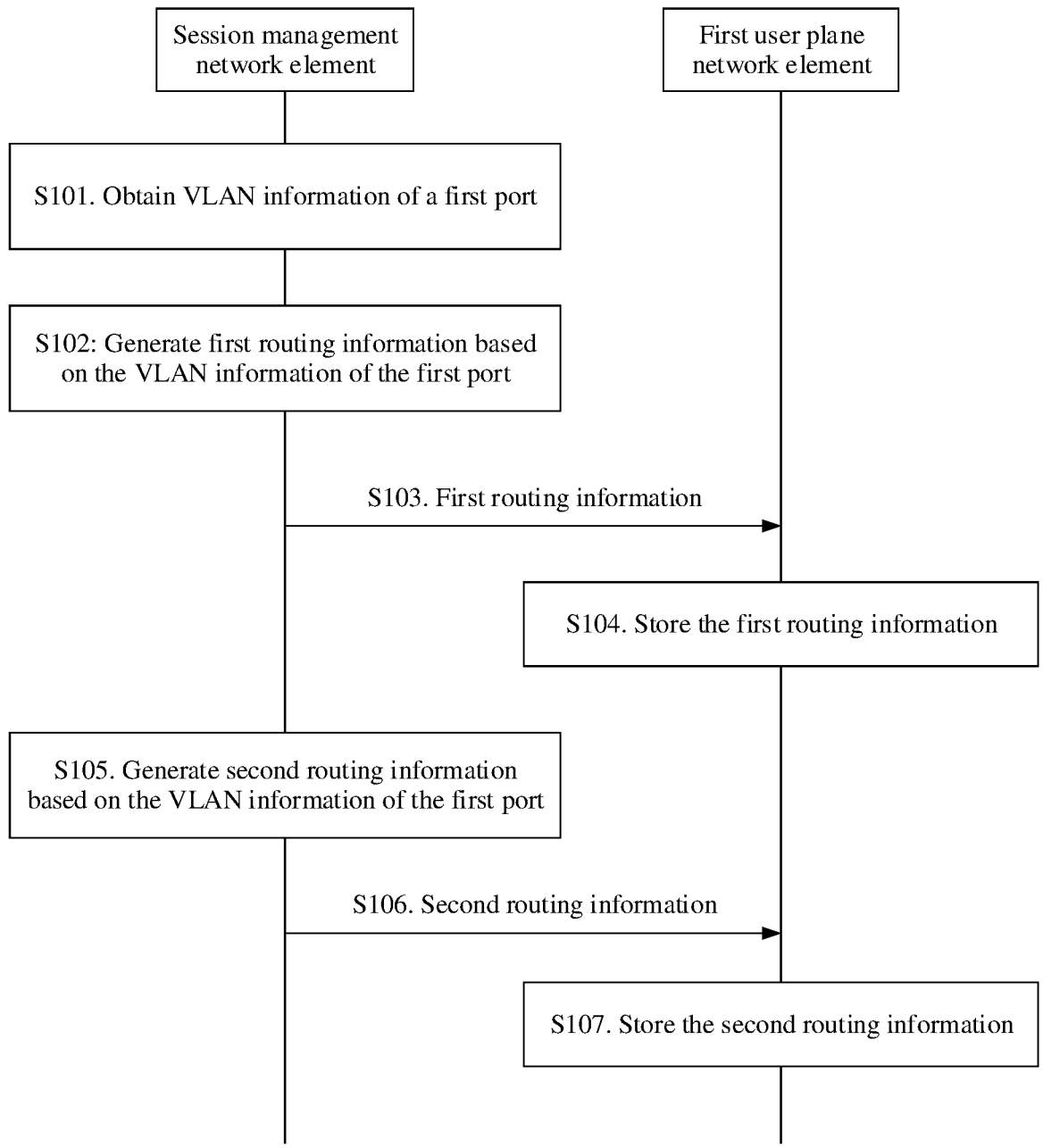
FIG. 7 is a flowchart of a route configuration method according to an embodiment of this application.

To resolve this technical problem, an embodiment of this application provides a route configuration method. As shown in FIG. 7, the method includes the following steps.

S101. A session management network element obtains VLAN information of a first port.

The first port is a port, which corresponds to an established PDU session of a first terminal, on a first user plane network element. The first user plane network element is a user plane network element that provides a 5GLAN service for the first terminal.

Optionally, the first port may be a virtual port, for example, an N3 port. The session management network element or the first user plane network element may configure port information of the first port. It may be understood that when the first user plane network element configures the port information of the first port, the session management network element may obtain the port information of the first port from the first user plane network element.

For example, the port information of the first port may include a combination of one or more of the following: an IP address, a port number, a MAC address, or a TEID.

In this embodiment of this application, for port information of another port, refer to the port information of the first port. General descriptions are provided herein, and details are not described below again.

In this embodiment of this application, the session management network element may allocate the first user plane network element to the first terminal based on factors such as a location of the first terminal, a service range of each user plane network element associated with the session management network element, and a service capability of each user plane network element managed by the session management network element. For a specific implementation thereof, refer to a conventional technology. Details are not described herein.

The VLAN information of the first port includes a combination of one or more of the following: a default VID of the first port, an allowed VID list of the first port, or an untagged VID list of the first port.

The default VID of the first port identifies a packet that is received through the first port and that does not carry a VID. Optionally, the default VID of the first port may be a VID corresponding to a VLAN to which the first terminal belongs.

The allowed VID list of the first port records one or more VIDs. A VID recorded in the allowed VID list of the first port is the same as a VID carried in a packet allowed to pass through the first port.

The untagged VID list of the first port records one or more VIDs. A VID recorded in the untagged VID list of the first port is the same as a VID removed from a packet to be sent through the first port.

The allowed VID list may have another name, for example, a tagged list. This is not limited in this embodiment of this application.

The untagged VID list may have another name, for example, an untagged list. This is not limited in this embodiment of this application.

Optionally, the VLAN information of the first port may further include another parameter, for example, an interface mode, a priority of each VID in the allowed VID list, a priority of each VID in the untagged VID list, indication information, and/or a first action indication.

A priority of a VID is used to determine a matching sequence of the VID in the allowed VID list or the untagged VID list. A higher priority of the VID indicates a higher matching sequence of the VID in the allowed VID list or the untagged VID list. For example, it is assumed that the allowed VID list sequentially includes a VID 1, a VID 2, and a VID 3, a priority of the VID 2 is higher than that of the VID 1, and the priority of the VID 1 is higher than that of the VID 3. In this way, for a packet received through the first port, it is first determined whether a VID carried in the packet matches the VID 2. When the VID carried in the packet does not match the VID 2, it is further determined whether the VID carried in the packet matches the VID 1. Then, when the VID carried in the packet does not match the VID 1, it is further determined whether the VID carried in the packet matches the VID 3.

The interface mode includes an access type, a trunk type, or a hybrid type. Optionally, the interface mode may have another name, for example, an interface type or a port type. This is not limited herein.

In this embodiment of this application, if the VLAN information of the first port includes the interface mode, the session management network element may determine an interface mode of the first port based on the interface mode included in the VLAN information of the first port. In other words, the session management network element may determine that the first port is an access port, a trunk port, or a hybrid port.

In this embodiment of this application, if the VLAN information of the first port does not include the interface mode, the session management network element may determine an interface mode of the first port based on a type of a VLAN parameter included in the VLAN information of the first port. For example, if the VLAN information of the first port includes the default VID of the first port and does not include the allowed VID list or the untagged VID list of the first port, the session management network element determines that the first port is an access port. If the VLAN information of the first port includes the default VID and the allowed VID list of the first port and does not include the untagged VID list of the first port, the session management network element determines that the first port is a trunk port. If the VLAN information of the first port includes the default VID of the first port, the allowed VID list of the first port, and the untagged VID list of the first port, the session management network element may determine that the first port is a hybrid port.

The indication information indicates whether the first terminal supports a VLAN. When the indication information indicates that the first terminal supports the VLAN, a packet sent by the first user plane network element to the first terminal through the first port may carry or not carry a VLAN tag. When the indication information indicates that the first terminal does not support the VLAN, a packet sent by the first user plane network element to the first terminal through the first port cannot carry a VLAN tag.

Optionally, the first action indication indicates an operation on an uplink packet sent by the first terminal and/or a downlink packet to be sent to the first terminal. The operation indicated by the first action indication includes a combination of one or more of the following:
  an operation 1-1: skipping handling a VID carried in the uplink packet;
  an operation 1-2: adding the default VID of the first port to the uplink packet;
  an operation 1-3: skipping handling a VID carried in the downlink packet;
  an operation 1-4: removing the default VID of the first port or a VID in the untagged VID list of the first port from the downlink packet;
  an operation 1-5: skipping determining, based on the allowed VID list of the first port, whether to allow transmission of the uplink packet;
  an operation 1-6: skipping determining, based on the allowed VID list of the first port, whether to allow transmission of the downlink packet;
  an operation 1-7: determining, based on the allowed VID list of the first port, whether to allow transmission of the uplink packet;
  an operation 1-8: determining, based on the allowed VID list of the first port, whether to allow transmission of the downlink packet;
  an operation 1-9: skipping adding a S-TAG to the uplink packet;
  an operation 1-10: skipping removing the S-TAG from the downlink packet;
  an operation 1-11: adding the S-TAG to the uplink packet; or
  an operation 1-12: removing the S-TAG from the downlink packet.

The operation 1-1 to the operation 1-12 are merely examples, and the first action indication may further indicate another operation. This is not limited herein.

Optionally, the first action indication may include a plurality of indications that do not conflict with each other in the operation 1-1 to the operation 1-12. For example, the first action indication may include the operation 1-2 and the operation 1-7.

In this embodiment of this application, the VLAN information of the first port may have another name, for example, VLAN information of a PDU session established by the first terminal. This is not specifically limited.

In this embodiment of this application, the allowed VID list of the first port may have another name, for example, an allowed VID list of a PDU session established by the first terminal. This is not specifically limited.

In this embodiment of this application, the untagged VID list of the first port may have another name, for example, a tagged VID list of a PDU session established by the first terminal. This is not specifically limited.

In this embodiment of this application, the default VID of the first port may have another name, for example, a default VID of a PDU session established by the first terminal. This is not specifically limited.

In a possible implementation, in a process in which the first terminal establishes the PDU session, the session management network element first obtains VLAN information of the first terminal. Then, the session management network element determines the VLAN information of the first port based on the VLAN information of the first terminal.

Optionally, the VLAN information of the first terminal may include a combination of one or more of the following VLAN parameters: indication information, a default VID, an allowed VID list, an untagged VID list, an interface mode, a first action indication, a S-TAG, or a priority of a VID.

Optionally, that the session management network element determines the VLAN information of the first port based on the VLAN information of the first terminal includes a combination of one or more of the following implementations:

Implementation 1: When the VLAN information of the first terminal includes the allowed VID list, the session management network element may determine the allowed VID list included in the VLAN information of the first terminal as the allowed VID list of the first port.

For example, the allowed VID list included in the VLAN information of the first terminal includes a VID 1, a VID 2, and a VID 3, so that the allowed VID list of the first port also includes the VID 1, the VID 2, and the VID 3.

Implementation 2: When the VLAN information of the first terminal includes the untagged VID list, the session management network element may determine the untagged VID list included in the VLAN information of the first terminal as the untagged VID list of the first port.

For example, the untagged VID list included in the VLAN information of the first terminal includes a VID 2 and a VID 3, so that the untagged VID list of the first port includes the VID 2 and the VID 3.

Implementation 3: When the VLAN information of the first terminal includes the first action indication, the session management network element may determine the first action indication included in the VLAN information of the first terminal as the first action indication included in the VLAN information of the first port.

Implementation 4: When the VLAN information of the first terminal includes the S-TAG, the session management network element may determine the S-TAG included in the VLAN information of the first terminal as the S-TAG included in the VLAN information of the first port.

Implementation 5: When the VLAN information of the first terminal includes the default VID, the session management network element may determine the default VID included in the VLAN information of the first terminal as the default VID of the first port included in the VLAN information of the first port.

Implementation 6: When the VLAN information of the first terminal does not include the interface mode or the default VID, and the VLAN information of the first terminal includes the allowed VID list, the session management network element may determine a VID that meets a preset condition in the allowed VID list included in the VLAN information of the first terminal as the default VID of the first port.

Optionally, when the VLAN information of the first terminal includes the allowed VID list, and the VLAN information of the first terminal does not include the default VID, the session management network element may determine a VID that meets a preset condition in the allowed VID list (or the untagged VID list) included in the VLAN information of the first terminal as the default VID of the first port.

Optionally, the VID that meets the preset condition in the allowed VID list included in the VLAN information of the first terminal may be:
  the first VID in the allowed VID list included in the VLAN information of the first terminal;
  the last VID in the allowed VID list included in the VLAN information of the first terminal;
  a VID with a highest priority in the allowed VID list included in the VLAN information of the first terminal; or
  a VID with a lowest priority in the allowed VID list included in the VLAN information of the first terminal.

Implementation 7: When the VLAN information of the first terminal does not include the default VID, the VLAN information of the first terminal includes the allowed VID list and the interface mode, and the interface mode is the access type, the session management network element determines only one VID in the allowed VID list included in the VLAN information of the first terminal as the default VID of the first port.

Implementation 8: When the VLAN information of the first terminal does not include the default VID, the VLAN information of the first terminal includes the allowed VID list and the interface mode, and the interface mode is the trunk type or the hybrid type, the session management network element may determine a VID that meets a preset condition in the allowed VID list included in the VLAN information of the first terminal as the default VID of the first port.

Implementation 9: When the VLAN information of the first terminal does not include the untagged VID list, the session management network element may use the default VID of the first port as the untagged VID list of the first port. In other words, the untagged VID list of the first port includes only the default VID of the first port.

Optionally, that the first terminal obtains the VLAN information of the first terminal includes at least one of the following manners:

Manner 1: The session management network element obtains the VLAN information of the first terminal from the first terminal.

For example, the session management network element receives a session establishment request message from the first terminal, where the session establishment request message includes the VLAN information of the first terminal.

Manner 2: The session management network element obtains the VLAN information of the first terminal from a data management network element.

Optionally, the data management network element may be a UDM in 5G.

For example, the session management network element obtains subscription data from the data management network element, where the subscription data includes the VLAN information of the first terminal. It may be understood that for an implementation in which the session management network element obtains the subscription data, refer to the conventional technology. Details are not described herein.

Manner 3: The session management network element obtains the VLAN information of the first terminal from a policy control function network element.

Optionally, the policy control function network element may be a PCF in 5G.

For example, the session management network element sends a policy control obtaining request to the policy control function network element, where the policy control obtaining request may include a session identifier, an identifier of the first terminal, and a policy index. Then, the session management network element receives a policy control obtaining response message sent by the policy control function network element, where the policy control obtaining response message carries a policy and charging control (policy and charging control, PCC) rule, and the PCC rule includes the VLAN information of the first terminal.

Optionally, the policy control function network element may directly obtain the VLAN information of the first terminal from an application function entity. Alternatively, the policy function network element may obtain the VLAN information of the first terminal from an application function entity through an exposure function network element. The application function entity may be an AF in 5G. The exposure function network element may be an NEF in 5G.

Manner 4: The session management network element obtains the VLAN information of the first terminal from an authentication server.

Optionally, the authentication server may be an authentication, authorization, accounting (authentication, authorization, accounting, AAA) server corresponding to a data network.

For example, the session management network element sends an authorization request to the authentication server. Then, the session management network element receives an authentication authorization response message sent by the authentication server. The authentication authorization response message includes the VLAN information of the first terminal. Optionally, the authentication authorization response message may further include other information, for example, a policy index.

In this embodiment of this application, the session management network element may obtain the VLAN information of the first terminal in only one of the manner 1 to the manner 4. Alternatively, the session management network element may obtain a plurality of pieces of VLAN information of the first terminal in a plurality of the manner 1 to the manner 4.

Optionally, when the session management network element obtains a plurality of pieces of VLAN information of the first terminal, if the plurality of pieces of VLAN information include a target VLAN parameter of a same type, a target VLAN parameter included in VLAN information with a highest priority in the plurality of pieces of VLAN information is used as a target VLAN parameter included in the VLAN information of the first port. If first VLAN information in the plurality of pieces of VLAN information includes a target VLAN parameter, and other VLAN information than the first VLAN information in the plurality of pieces of VLAN information does not include the target VLAN parameter, the target VLAN parameter in the first VLAN information is used as a target VLAN parameter included in the VLAN information of the first port. The target VLAN parameter may be any one of the VLAN parameters. The first VLAN information may be any one of the plurality of pieces of VLAN information.

A priority of VLAN information depends on a priority of a source of the VLAN information. For example, priorities of sources of VLAN information in descending order are: the policy control function network element, the authentication server, the data management network element, and the first terminal. Correspondingly, priorities of VLAN information in descending order are: VLAN information obtained from the policy control function network element, VLAN information obtained from the authentication server, VLAN information obtained from the data management network element, and VLAN information obtained from the first terminal.

For example, it is assumed that the session management network element obtains VLAN information 1 of the first terminal from the authentication server, where the VLAN information 1 includes a default VID 1 and an allowed VID list 1. The session management network element obtains VLAN information 2 of the first terminal from the policy control function network element, where the VLAN information 2 includes a default VID 2, an allowed VID list 2, and an untagged VID list 2. The session management network element obtains VLAN information 3 of the first terminal from the data management network element, where the VLAN information 3 includes an untagged VID list 3 and an interface mode 3. Priorities of the VLAN information in descending order are: the VLAN information 2, the VLAN information 1, and the VLAN information 3. Therefore, the session management network element may determine that the VLAN information of the first port includes: the default VID 2, the allowed VID list 2, the untagged VID list 2, and the interface mode 3.

S102. The session management network element generates first routing information based on the VLAN information of the first port.

The first routing information is used by the first user plane network element to handle a first packet, and the first packet is a packet of the first terminal received by the first user plane network element through the first port. In other words, the first packet is a packet received by the first user plane network element from the first terminal.

For example, a source MAC address of the first packet may be a MAC address of the first terminal, or a MAC address of another terminal managed by the first terminal.

In a possible design, a VLAN parameter included in the first routing information is unrelated to the interface mode of the first port. In other words, regardless of a type of the first port, the first routing information includes the default VID of the first port and the allowed VID list of the first port.

In some cases, for example, when the first port is the access port, the VLAN information of the first port may not include the allowed VID list of the first port. Therefore, the session management network element may determine the allowed VID list of the first port based on the default VID of the first port. In this case, the allowed VID list of the first port includes only the default VID of the first port.

Optionally, that the first routing information is used by the first user plane network element to handle a first packet includes a combination of one or more of the following:
(1-1) the first routing information indicates the first user plane network element to add the default VID of the first port to the first packet when the first packet does not carry a VID;
(1-2) the first routing information indicates the first user plane network element to accept the first packet when the allowed VID list of the first port includes a VID carried in the first packet; or
(1-3) the first routing information indicates the first user plane network element to discard the first packet when the allowed VID list of the first port does not include a VID carried in the first packet.

In another possible design, a VLAN parameter included in the first routing information is related to the interface mode of the first port. Therefore, the first routing information includes the following two cases:

Case 1: When the first port is the access port, the first routing information includes the default VID, and the first routing information does not include the allowed VID list of the first port. In this case, that the first routing information is used by the first user plane network element to handle a first packet includes a combination of one or more of the following:
(1-1) the first routing information indicates the first user plane network element to add the default VID of the first port to the first packet when the first packet does not carry a VID;
(1-4) the first routing information indicates the first user plane network element to accept the first packet when a VID carried in the first packet is the same as the default VID of the first port; or
(1-5) the first routing information indicates the first user plane network element to discard the first packet when a VID carried in the first packet is different from the default VID of the first port.

Case 2: When the first port is the trunk port or the hybrid port, the first routing information includes the default VID of the first port and the allowed VID list of the first port. In this case, that the first routing information is used by the first user plane network element to handle a first packet includes at least one of (1-1) to (1-3).

Optionally, when the VLAN information of the first port includes the first action indication, the session management network element may further determine the first routing information based on the first action indication.

For example, if the first action indication includes the operation 1-1, the first routing information does not include the VLAN parameter. Therefore, the first routing information indicates the first user plane network element to accept the first packet.

For another example, if the first action indication includes the operation 1-2, the first routing information includes at least the default VID of the first port. Therefore, that the first routing information is used by the first user plane network element to handle a first packet includes at least (1-1).

For another example, if the first action indication includes the operation 1-5, the first routing information does not include the allowed VID list of the first port. Therefore, that the first routing information is used by the first user plane network element to handle a first packet does not include (1-2) or (1-3).

For another example, if the first action indication includes the operation 1-7, the first routing information includes the allowed VID list of the first port. Therefore, that the first routing information is used by the first user plane network element to handle a first packet includes (1-2) and (1-3).

For another example, if the first action indication includes the operation 1-9, the first routing information does not include the S-TAG. Therefore, that the first routing information is used by the first user plane network element to handle a first packet does not include (1-6) in the following.

For another example, if the first action indication includes the operation 1-11, the first routing information includes the S-TAG. Therefore, that the first routing information is used by the first user plane network element to handle a first packet includes (1-6) in the following:

(1-6) the first routing information indicates the first user plane network element to add the S-TAG to the first packet.

In this embodiment of this application, the first routing information may be represented by a first PDR or a first FAR.

For example, when the first routing information is represented by the first PDR, a packet detection information (packet detection information, PDI) information element (information element, IE), an outer header removal (outer header removal) IE, or another extended IE in the first PDR may include the first routing information.

For example, when the first routing information is represented by the first FAR, an action IE, an outer header creation IE, a forwarding policy IE, a container for header enrichment IE, or another extended IE in the first FAR may include the first routing information.

The foregoing extended IE may be named as a VLAN handling indication IE, or have another name. This is not limited. For an extended IE in another PDR or FAR below, refer to the extended IE in the first PDR or the first FAR. General descriptions are provided herein, and details are not described below again.

S103. The session management network element sends the first routing information to the first user plane network element, so that the first user plane network element receives the first routing information sent by the session management network element.

S104. The first user plane network element stores the first routing information.

S105. The session management network element generates second routing information based on the VLAN information of the first port.

The second routing information is used by the first user plane network element to handle a second packet, and the second packet is a packet to be sent by the first user plane network element to the first terminal through the first port. In other words, the second packet is a packet to be sent by the first user plane network element to the first terminal.

For example, a destination MAC address of the second packet may be the MAC address of the first terminal, or a MAC address of another terminal managed by the first terminal.

In a possible design, a VLAN parameter included in the second routing information is unrelated to the interface mode of the first port. In other words, regardless of a type of the first port, the second routing information includes the allowed VID list of the first port and the untagged VID list of the first port.

It may be understood that, when the first port is the access port, both the allowed VID list and the untagged VID list of the first port include only the default VID of the first port. When the first port is the trunk port, the untagged VID list of the first port includes only the default VID of the first port.

Optionally, that the second routing information is used by the first user plane network element to handle a second packet includes a combination of one or more of the following:

(2-1) the second routing information indicates the first user plane network element to discard the second packet when the allowed VID list of the first port does not include a VID carried in the second packet;

(2-2) the second routing information indicates the first user plane network element to send the second packet when the allowed VID list of the first port includes a VID carried in the second packet and the untagged VID list of the first port does not include the VID carried in the second packet; or (2-3) the second routing information indicates the first user plane network element to remove a VID carried in the second packet and send the second packet without the VID when the allowed VID list of the first port includes the VID carried in the second packet and the untagged VID list of the first port includes the VID carried in the second packet.

In another possible design, a VLAN parameter included in the second routing information is related to the interface mode of the first port. Therefore, the second routing information includes the following three cases:

Case 1: When the first port is the access port, the second routing information includes the default VID of the first port, and does not include the allowed VID list or the untagged VID list of the first port. In this case, that the second routing information is used by the first user plane network element to handle a second packet includes a combination of one or more of the following:

(2-4) the second routing information indicates the first user plane network element to discard the second packet when a VID carried in the second packet is different from the default VID of the first port; or (2-5) the second routing information indicates the first user plane network element to remove a VID carried in the second packet and send the second packet without the VID when the VID carried in the second packet is the same as the default VID of the first port.

Case 2: When the first port is the trunk port, the second routing information includes the default VID of the first port and the allowed VID list of the first port, and does not include the untagged VID list of the first port. In this case, that the second routing information is used by the first user plane network element to handle a second packet includes a combination of one or more of the following:

(2-1) the second routing information indicates the first user plane network element to discard the second packet when the allowed VID list of the first port does not include a VID carried in the second packet;

(2-6) the second routing information indicates the first user plane network element to send the second packet when the allowed VID list of the first port includes a VID carried in the second packet and the VID carried in the second packet is different from the default VID of the first port; or (2-7) the second routing information indicates the first user plane network element to remove a VID carried in the second packet and send the second packet without the VID when the allowed VID list of the first port includes the VID carried in the second packet and the VID carried in the second packet is the same as the default VID of the first port.

Case 3: When the first port is the hybrid port, the second routing information includes the allowed VID list of the first port and the untagged VID list of the first port. In this case, that the second routing information is used by the first user plane network element to handle a second packet includes at least one of (2-1) to (2-3).

Optionally, when the VLAN information of the first port includes the first action indication, the session management network element may further determine the second routing information based on the first action indication.

For example, if the first action indication includes the operation 1-2, the second routing information does not include the VLAN parameter. Therefore, the second routing information indicates the first user plane network element to send the second packet.

For another example, if the first action indication includes the operation 1-4, the second routing information includes the default VID or the untagged VID list of the first port. Therefore, that the second routing information is used by the first user plane network element to handle a second packet includes at least (2-3), (2-5), or (2-7).

For another example, if the first action indication includes the operation 1-6, the second routing information does not include the allowed VID list of the first port. Therefore, that the second routing information is used by the first user plane network element to handle a second packet does not include (2-2), (2-3), (2-6), or (2-7).

For another example, if the first action indication includes the operation 1-8, the second routing information includes the allowed VID list of the first port. Therefore, that the second routing information is used by the first user plane network element to handle a second packet includes at least (2-2) and (2-3). Alternatively, that the second routing information is used by the first user plane network element to handle a second packet includes at least (2-6) and (2-7).

For another example, if the first action indication includes the operation 1-10, the second routing information does not include the S-TAG. Therefore, that the second routing information is used by the first user plane network element to handle a second packet does not include (2-8) in the following.

For another example, if the first action indication includes the operation 1-12, the second routing information includes the S-TAG. Therefore, that the second routing information is used by the first user plane network element to handle a second packet includes (2-8) in the following:

(2-8) the second routing information indicates the first user plane network element to remove the S-TAG from the second packet.

In this embodiment of this application, the second routing information may be represented by a second PDR or a second FAR.

For example, when the second routing information is represented by the second PDR, packet detection information, an outer header removal IE, or another extended IE in the second PDR may include the second routing information.

For example, when the second routing information is represented by the second FAR, an action IE, an outer header creation IE, a forwarding policy IE, a container for header enrichment IE, or another extended IE in the second FAR may include the second routing information.

It may be understood that a VLAN parameter included in the IE in the second PDR or the second FAR is the VLAN parameter included in the second routing information.

S106. The session management network element sends the second routing information to the first user plane network element, so that the first user plane network element receives the second routing information sent by the session management network element.

S107. The first user plane network element stores the second routing information.

An order of performing steps S102 to S104 and steps S105 to S107 is not limited in this embodiment of this application. For example, steps S102 to S104 may be performed before steps S105 to S107; steps S105 to S107 may be performed before steps S102 to S104; or steps S102 to S104 and steps S105 to S107 are simultaneously performed.

When steps S105 and S107 are simultaneously performed, the first routing information and the second routing information may be carried in different signaling; or the first routing information and the second routing information may be carried in same signaling, for example, an N4 session creation request message. The N4 session creation request message is used to create an N4 session corresponding to the PDU session established by the first terminal.

Based on the technical solution shown in FIG. 7, in a scenario in which a 5GLAN communicates with an external LAN, the VLAN information of the first port may reflect a networking manner and a VLAN configuration of a network in which the first terminal is located. The first routing information and the second routing information are generated based on the VLAN information of the first port. Therefore, the first user plane network element may handle the first packet based on the first routing information, and handle the second packet based on the second routing information. As a result, a manner in which the first user plane network element handles a packet may adapt to the networking manner and the VLAN configuration of the network in which the first terminal is located, to ensure normal communication of the external LAN.

The technical solution shown in FIG. 7 may be applied to the process in which the first terminal establishes the PDU session. For the session management network element, the process in which the first terminal establishes the PDU session is a period of time after the session management network element receives a PDU session establishment request message from the first terminal and before the session management network element sends a PDU session establishment response message.

In some scenarios, because the first terminal may not be the $1^{st}$ terminal in a 5GLAN group that establishes the PDU session to access the 5GLAN service, there may be another user plane network element besides the first user plane network element in the 5GLAN. The another user plane network element may serve another terminal in the 5GLAN group. For ease of description, the another user plane network element besides the first user plane network element in the 5GLAN is referred to as a second user plane network element for short below.

In a possible design, when there is further the second user plane network element in the 5GLAN, a first tunnel may be established between the first user plane network element and the second user plane network element, and the first tunnel may be configured to transparently transmit all packets. In this case, the session management network element may configure routing information related to the first tunnel on the first user plane network element and the second user plane network element according to the conventional technology.

Figure 8:
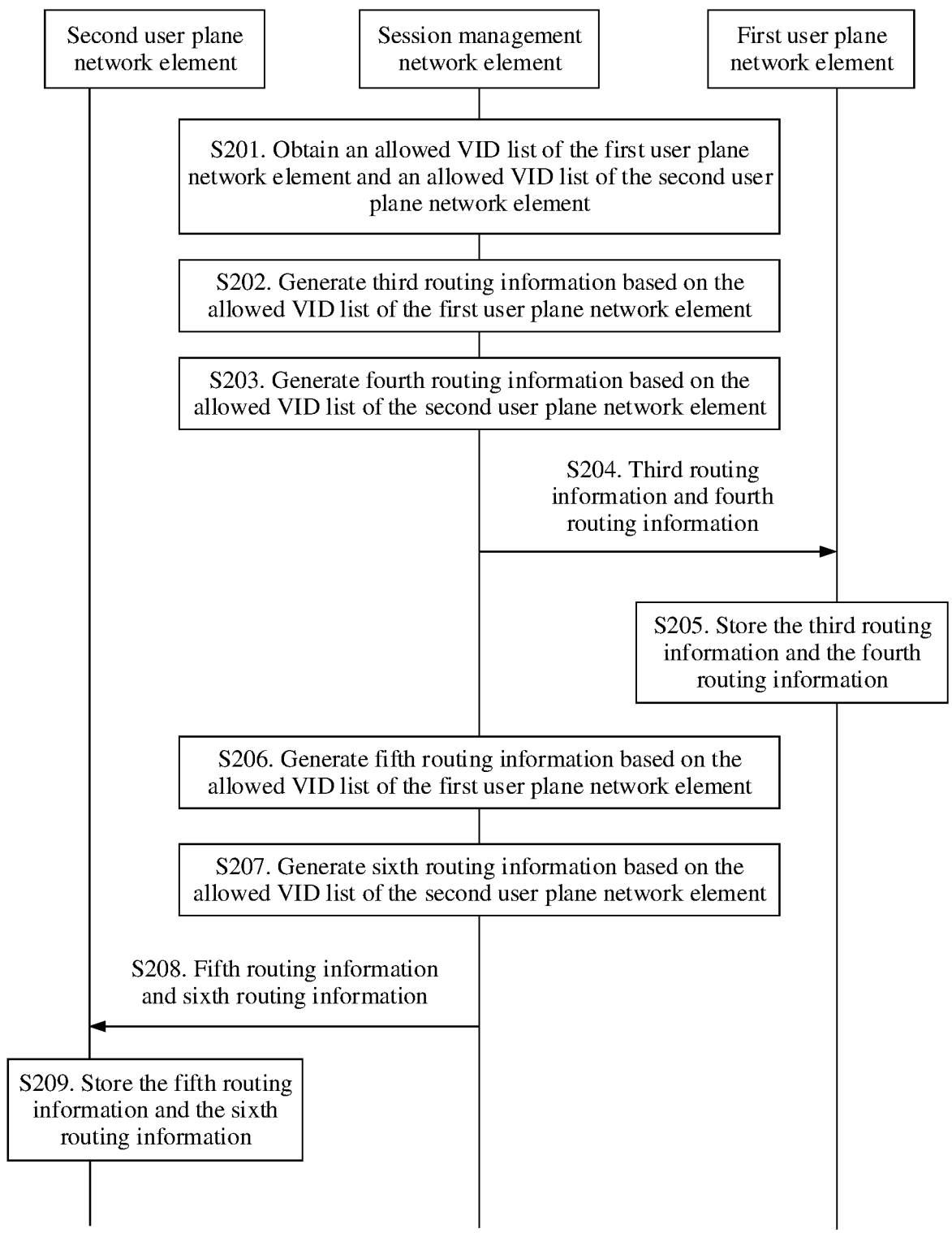
FIG. 8 is a flowchart of another route configuration method according to an embodiment of this application.

In another possible design, when there is further the second user plane network element in the 5GLAN, the session management network element may configure corresponding routing information on the first user plane network element and the second user plane network element according to the route configuration method shown in FIG. 8.

FIG. 8 shows a route configuration method according to an embodiment of this application. The method includes the following steps.

S201. A session management network element obtains an allowed VID list of a first user plane network element and an allowed VID list of a second user plane network element.

In a possible implementation, the session management network element obtains allowed VID lists of ports corresponding to various PDU sessions on the first user plane network element and allowed VID lists of ports corresponding to various PDU sessions on the second user plane network element. Then, the session management network element uses a union set of the allowed VID lists of the ports corresponding to the various PDU sessions on the first user plane network element as the allowed VID list of the first user plane network element. The session management network element uses a union set of the allowed VID lists of the ports corresponding to the various PDU sessions on the second user plane network element as the allowed VID list of the second user plane network element.

For example, a UPF 1 provides services for a terminal 1, a terminal 2, and a terminal 3. Correspondingly, the UPF 1 has a port 1 corresponding to a PDU session established by the terminal 1, a port 2 corresponding to a PDU session established by the terminal 2, and a port 3 corresponding to a PDU session established by the terminal 3. An allowed VID list of the port 1 includes a VID 1, a VID 2, and a VID 3. An allowed VID list of the port 2 includes the VID 1, a VID 4, and a VID 5. An allowed VID list of the port 3 includes a VID 6. Therefore, an allowed VID list of the UPF 1 includes the VID 1, the VID 2, the VID 3, the VID 4, the VID 5, and the VID 6.

It should be noted that, for an implementation in which the session management network element obtains an allowed VID list of a port corresponding to a PDU session on the first user plane network element or the second user plane network element, refer to an implementation in which the session management network element obtains an allowed VID list of a first port. Details are not described herein.

S202. The session management network element generates third routing information based on the allowed VID list of the first user plane network element.

The third routing information is used by the first user plane network element to handle a third packet. The third packet is a packet received by the first user plane network element from the second user plane network element. In other words, the third packet is a packet received by the first user plane network element from the second user plane network element through a second port.

The second port is a port of a first tunnel on the first user plane network element side. The first tunnel is a tunnel between the first user plane network element and the second user plane network element. For example, the first tunnel may be an N19 tunnel.

Optionally, the session management network element or the first user plane network element may configure port information of the second port. When the first user plane network element is responsible for configuring the port information of the second port, the session management network element may obtain the port information of the second port from the first user plane network element.

In this embodiment of this application, the third routing information includes the allowed VID list of the first user plane network element.

Optionally, that the third routing information is used by the first user plane network element to handle a third packet includes a combination of one or more of the following:

(3-1) the third routing information indicates the first user plane network element to discard the third packet when the allowed VID list of the first user plane network element does not include a VID carried in the third packet; or (3-2) the third routing information indicates the first user plane network element to accept the third packet when the allowed VID list of the first user plane network element includes a VID carried in the third packet.

Based on the third routing information, when the VID carried in the third packet does not exist in the allowed VID list of the first user plane network element, the first user plane network element does not need to further handle the third packet, to reduce pressure of handling an Ethernet packet by the first user plane network element.

In this embodiment of this application, the third routing information may be represented by a third PDR or a third FAR.

For example, when the third routing information is represented by the third PDR, packet detection information, an outer header removal IE, or another extended IE in the third PDR may include the third routing information.

For example, when the third routing information is represented by the third FAR, an action IE, an outer header creation IE, a forwarding policy IE, a container for header enrichment IE, or another extended IE in the third FAR may include the third routing information.

S203. The session management network element generates fourth routing information based on the allowed VID list of the second user plane network element.

The fourth routing information is used by the first user plane network element to handle a fourth packet. The fourth packet is a packet to be sent by the first user plane network element to the second user plane network element. In other words, the fourth packet is a packet to be sent by the first user plane network element to the second user plane network element through the second port.

In this embodiment of this application, the fourth routing information includes the allowed VID list of the second user plane network element.

Optionally, that the fourth user plane network element is used by the first user plane network element to handle a fourth packet includes a combination of one or more of the following:
- (4-1) the fourth routing information indicates the first user plane network element to discard the fourth packet when the allowed VID list corresponding to the second user plane network element does not include a VID carried in the fourth packet; or
- (4-2) the fourth routing information indicates the first user plane network element to send the fourth packet when the allowed VID list corresponding to the second user plane network element includes a VID carried in the fourth packet.

Based on the fourth routing information, when the VID carried in the fourth packet does not exist in the allowed VID list of the second user plane network element, the first user plane network element does not need to send the fourth packet to the second user plane network element, to reduce unnecessary transmission overheads. In addition, the second user plane network element does not need to handle the fourth packet either, to reduce pressure of handling an Ethernet packet by the second user plane network element.

In this embodiment of this application, the fourth routing information may be represented by a fourth PDR or a fourth FAR.

For example, when the fourth routing information is represented by the fourth PDR, packet detection information, an outer header removal IE, or another extended IE in the fourth PDR may include the fourth routing information.

For example, when the fourth routing information is represented by the fourth FAR, an action IE, an outer header creation IE, a forwarding policy IE, a container for header enrichment IE, or another extended IE in the fourth FAR may include the fourth routing information.

S204. The session management network element sends the third routing information and the fourth routing information to the first user plane network element, so that the first user plane network element receives the third routing information and the fourth routing information.

Optionally, the session management network element may simultaneously send the third routing information and the fourth routing information, or may separately send the third routing information and the fourth routing information at different moments.

Optionally, the third routing information and the fourth routing information may be carried in same signaling, or may be carried in different signaling. The signaling that carries the third routing information and the fourth routing information may be an N4 session creation/modification request message.

S205. The first user plane network element stores the third routing information and the fourth routing information.

S206. The session management network element generates fifth routing information based on the allowed VID list of the first user plane network element.

The fifth routing information is used by the second user plane network element to handle a fifth packet. The fifth packet is a packet to be sent by the second user plane network element to the first user plane network element. In other words, the fifth packet is a packet to be sent by the second user plane network element to the first user plane network element through a third port. The third port is a port of the first tunnel on the second user plane network element side.

Optionally, the session management network element or the second user plane network element may configure port information of the third port. When the second user plane network element is responsible for configuring the port information of the third port, the session management network element may obtain the port information of the third port from the second user plane network element.

In this embodiment of this application, the fifth routing information includes the allowed VID list of the first user plane network element.

Optionally, that the fifth routing information is used by the second user plane network element to handle a fifth packet includes a combination of one or more of the following:
- (5-1) the fifth routing information indicates the second user plane network element to discard the fifth packet when the allowed VID list of the first user plane network element does not include a VID carried in the fifth packet; or
- (5-2) the fifth routing information indicates the second user plane network element to send the fifth packet when the allowed VID list of the first user plane network element includes a VID carried in the fifth packet.

Based on the fifth routing information, when the VID carried in the fifth packet does not exist in the allowed VID list of the first user plane network element, the second user plane network element does not need to send the fifth packet to the first user plane network element, to reduce unnecessary transmission overheads. In addition, the first user plane network element does not need to handle the fifth packet either, to reduce pressure of handling an Ethernet packet by the first user plane network element.

In this embodiment of this application, the fifth routing information may be represented by a fifth PDR or a fifth FAR.

For example, when the fifth routing information is represented by the fifth PDR, packet detection information, an outer header removal IE, or another extended IE in the fifth PDR may include the fifth routing information.

For example, when the fifth routing information is represented by the fifth FAR, an action IE, an outer header creation IE, a forwarding policy IE, a container for header enrichment IE, or another extended IE in the fifth FAR may include the fifth routing information.

S207. The session management network element generates sixth routing information based on the allowed VID list of the second user plane network element.

The sixth routing information is used by the second user plane network element to handle a sixth packet. The sixth packet is a packet received by the second user plane network element from the first user plane network element. In other words, the sixth packet is a packet received by the second user plane network element from the first user plane network element through the third port.

In this embodiment of this application, the sixth routing information includes the allowed VID list of the second user plane network element.

Optionally, that the sixth routing information is used by the second user plane network element to handle a sixth packet includes a combination of one or more of the following:
- (6-1) the sixth routing information indicates the second user plane network element to discard the sixth packet when the allowed VID list of the second user plane network element does not include a VID carried in the sixth packet; or (6-2) the sixth routing information indicates the second user plane network element to accept the sixth packet when the allowed VID list of the second user plane network element includes a VID carried in the sixth packet.

Based on the sixth routing information, when the VID carried in the sixth packet does not exist in the allowed VID list of the second user plane network element, the second user plane network element does not need to further handle the sixth packet, to reduce pressure of handling an Ethernet packet by the second user plane network element.

In this embodiment of this application, the sixth routing information may be represented by a sixth PDR or a sixth FAR.

For example, when the sixth routing information is represented by the sixth PDR, packet detection information, an outer header removal IE, or another extended IE in the sixth PDR may include the sixth routing information.

For example, when the sixth routing information is represented by the sixth FAR, an action IE, an outer header creation IE, a forwarding policy IE, a container for header enrichment IE, or another extended IE in the sixth FAR may include the sixth routing information.

S208. The session management network element sends the fifth routing information and the sixth routing information to the second user plane network element, so that the second user plane network element receives the fifth routing information and the sixth routing information that are sent by the session management network element.

Optionally, the session management network element may simultaneously send the fifth routing information and the sixth routing information, or may separately send the fifth routing information and the sixth routing information at different moments.

Optionally, the fifth routing information and the sixth routing information may be carried in same signaling, or may be carried in different signaling. The signaling that carries the fifth routing information and the sixth routing information may be an N4 session creation/modification request message.

S209. The second user plane network element stores the fifth routing information and the sixth routing information.

An order of performing steps S202 to S205 and steps S206 to S209 is not limited in this embodiment of this application. For example, steps S202 to S205 may be performed before steps S206 to S209; steps S206 to S209 may be performed before steps S202 to S205; or steps S202 to S205 and steps S206 to S209 are simultaneously performed.

Based on the technical solution shown in FIG. 8, this helps reduce pressure of handling an Ethernet packet by a user plane network element in a 5GLAN, and reduce transmission overheads of the Ethernet packet.

Figure 9:
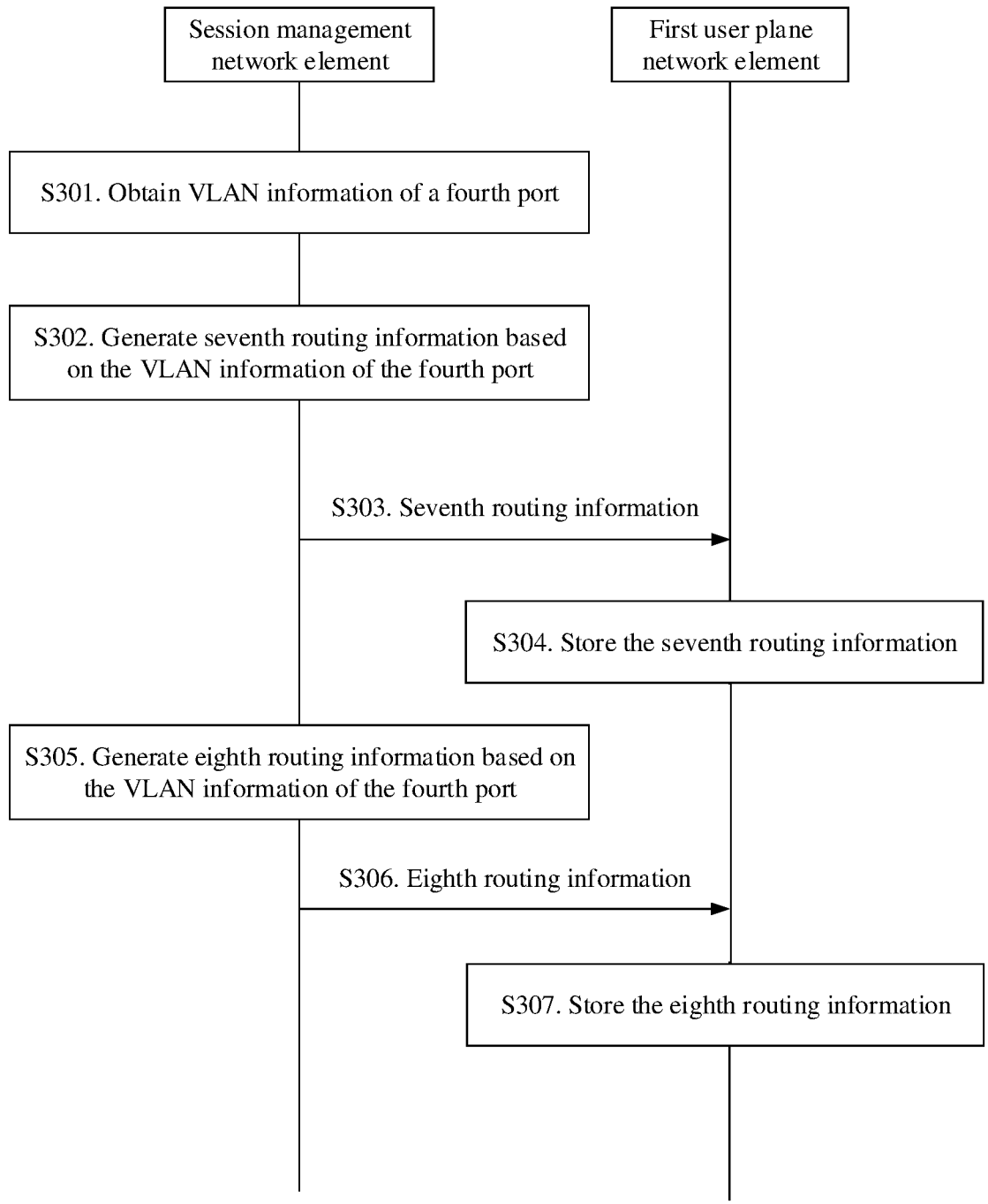
FIG. 9 is a flowchart of another route configuration method according to an embodiment of this application.

FIG. 9 shows a route configuration method according to an embodiment of this application. The method includes the following steps.

S301. A session management network element obtains VLAN information of a fourth port.

The fourth port is a port used by a first user plane network element to be connected to a data network. For example, the fourth port is an N6 port on the first user plane network element. In other words, the fourth port is a port of an N6 tunnel on the first user plane network element side.

The VLAN information of the fourth port includes a combination of one or more of the following: a default VID of the fourth port, an allowed VID list of the fourth port, or an untagged VID list of the fourth port.

The default VID of the fourth port identifies a packet that is received through the fourth port and that does not carry a VID.

The allowed VID list of the fourth port records one or more VIDs. A VID recorded in the allowed VID list of the fourth port is the same as a VID carried in a packet allowed to pass through the fourth port.

The untagged VID list of the fourth port records one or more VIDs. A VID recorded in the untagged VID list of the fourth port is the same as a VID removed from a packet to be sent through the fourth port.

Optionally, the VLAN information of the fourth port may further include another VLAN parameter, for example, an interface mode, a priority of a VID, indication information, and a second action indication.

Optionally, the second action indication indicates an operation on a packet sent by the data network and/or a packet to be sent to the data network. The operation indicated by the second action indication includes a combination of one or more of the following:

an operation 2-1: skipping handling a VID carried in the packet sent by the data network;
an operation 2-2: adding the default VID of the fourth port to the packet sent by the data network;
an operation 2-3: skipping handling a VID carried in the packet to be sent to the data network;
an operation 2-4: when the VID carried in the packet to be sent to the data network is the default VID of the fourth port or a VID in the untagged VID list of the fourth port, removing the VID carried in the packet to be sent to the data network;
an operation 2-5: skipping determining, based on the allowed VID list of the fourth port, whether to allow transmission of the packet sent by the data network;
an operation 2-6: skipping determining, based on the allowed VID list of the fourth port, whether to allow transmission of the packet to be sent to the data network;
an operation 2-7: determining, based on the allowed VID list of the fourth port, whether to allow transmission of the packet sent by the data network;
an operation 2-8: determining, based on the allowed VID list of the fourth port, whether to allow transmission of the packet to be sent to the data network;
an operation 2-9: skipping adding a S-TAG to the packet sent by the data network;
an operation 2-10: skipping removing the S-TAG from the packet to be sent to the data network;
an operation 2-11: adding the S-TAG to the packet sent by the data network; or
an operation 2-12: removing the S-TAG from the packet to be sent to the data network.

The operation 2-2 to the operation 2-12 are merely examples, and the second action indication may further indicate another operation. This is not limited herein.

Optionally, the second action indication may include a plurality of indications that do not conflict with each other in the operation 2-2 to the operation 2-12. For example, the second action indication may include the operation 2-2 and the operation 2-7.

In a possible implementation, the session management network element first obtains VLAN information of the data network and/or locally configured VLAN information.

Then, the session management network element determines the VLAN information of the fourth port based on the VLAN information of the data network and/or the locally configured VLAN information.

It may be understood that, for a manner of determining the VLAN information of the fourth port, refer to the manner of determining the VLAN information of the first port in the embodiment shown in FIG. 7. Details are not described herein again.

The locally configured VLAN information may be preconfigured on the session management network element, or may be preconfigured on the first user plane network element. It may be understood that when the locally configured VLAN information is preconfigured on the first user plane network element, the session management network element may obtain the locally configured VLAN information from the first user plane network element.

In this embodiment of this application, for VLAN parameters that may be included in the VLAN information of the data network and the locally configured VLAN information, refer to VLAN information of a first terminal. Details are not described herein again.

Optionally, that the session management network element obtains the VLAN information of the data network includes at least one of the following manners:

Manner 1: The session management network element obtains the VLAN information of the data network from an authentication server.

For example, the session management network element sends an authorization request to the authentication server. Then, the session management network element receives an authentication authorization response message sent by the authentication server. The authentication authorization response message includes the VLAN information of the data network.

Manner 2: The session management network element obtains the VLAN information of the data network from a policy control function network element.

For example, the session management network element sends a policy control obtaining request to the policy control function network element. Then, the session management network element receives a policy control obtaining response message sent by the policy control function network element, where the policy control obtaining response message carries a policy and charging control (PCC) rule, and the PCC rule includes the VLAN information of the data network.

Optionally, the policy control function network element may directly obtain the VLAN information of the data network from an application function entity. Alternatively, the policy function network element may obtain the VLAN information of the data network from an application function entity through an exposure function network element.

S302. The session management network element generates seventh routing information based on the VLAN information of the fourth port.

The seventh routing information is used by the first user plane network element to handle a seventh packet. The seventh packet is a packet received by the first user plane network element from the data network through the fourth port. In other words, the seventh packet is a packet received by the first user plane network element from a device or a server in the data network through the fourth port.

In a possible design, a VLAN parameter included in the seventh routing information is unrelated to the interface mode of the fourth port. In other words, regardless of a type of the fourth port, the seventh routing information includes the default VID of the fourth port and the allowed VID list of the fourth port.

It may be understood that, when the fourth port is an access port, the allowed VID list of the fourth port includes only the default VID of the fourth port.

Optionally, that the seventh routing information is used by the first user plane network element to handle a seventh packet includes a combination of one or more of the following:

(7-1) the seventh routing information indicates the first user plane network element to add the default VID of the fourth port to the seventh packet when the seventh packet does not carry a VID;

(7-2) the seventh routing information indicates the first user plane network element to accept the seventh packet when the allowed VID list of the fourth port includes a VID carried in the seventh packet; or (7-3) the seventh routing information indicates the first user plane network element to discard the seventh packet when the allowed VID list of the fourth port does not include a VID carried in the seventh packet.

In another possible design, a VLAN parameter included in the seventh routing information is related to the interface mode of the fourth port. Therefore, the seventh routing information includes the following two cases:

Case 1: When the fourth port is an access port, the seventh routing information includes the default VID of the fourth port, and does not include the allowed VID list of the fourth port. In this case, that the seventh routing information is used by the first user plane network element to handle a seventh packet includes a combination of one or more of the following:

(7-1) the seventh routing information indicates the first user plane network element to add the default VID of the fourth port to the seventh packet when the seventh packet does not carry a VID;

(7-4) the seventh routing information indicates the first user plane network element to accept the seventh packet when a VID carried in the seventh packet is the same as the default VID of the fourth port; or (7-5) the seventh routing information indicates the first user plane network element to discard the seventh packet when a VID carried in the seventh packet is different from the default VID of the fourth port.

Case 2: When the fourth port is a trunk port or a hybrid port, the seventh routing information includes the default VID of the fourth port and the allowed VID list of the fourth port. In this case, that the seventh routing information is used by the first user plane network element to handle a seventh packet includes at least one of (7-1) to (7-3).

Optionally, when the VLAN information of the fourth port includes the second action indication, the session management network element may further determine the seventh routing information based on the second action indication.

For example, if the second action indication includes the operation 2-1, the seventh routing information does not include the VLAN parameter. Therefore, the seventh routing information indicates the first user plane network element to accept the seventh packet.

For another example, if the second action indication includes the operation 2-2, the seventh routing information includes at least the default VID of the fourth port. Therefore, that the seventh routing information is used by the first user plane network element to handle a seventh packet includes at least (7-1).

For another example, if the second action indication includes the operation 2-5, the seventh routing information does not include the allowed VID list of the fourth port. Therefore, that the seventh routing information is used by the first user plane network element to handle a seventh packet does not include (7-2) or (7-3).

For another example, if the second action indication includes the operation 2-7, the seventh routing information includes the allowed VID list of the fourth port. Therefore, that the seventh routing information is used by the first user plane network element to handle a seventh packet includes (7-2) and (7-3).

For another example, if the second action indication includes the operation 2-9, the seventh routing information does not include the S-TAG. Therefore, that the seventh routing information is used by the first user plane network element to handle a seventh packet does not include (7-6) in the following.

For another example, if the second action indication includes the operation 2-11, the seventh routing information includes the S-TAG. Therefore, that the seventh routing information is used by the first user plane network element to handle a seventh packet includes (7-6) in the following:

(7-6) the seventh routing information indicates the first user plane network element to add the S-TAG to the seventh packet.

In this embodiment of this application, the seventh routing information may be a seventh PDR or a seventh FAR.

For example, when the seventh routing information is the seventh PDR, packet detection information, an outer header removal IE, or another extended IE in the seventh PDR may include one or more VLAN parameters (for example, the allowed VID list of the fourth port and the default VID of the fourth port).

For example, when the seventh routing information is the seventh FAR, an action IE, an outer header creation IE, a forwarding policy IE, a container for header enrichment IE, or another extended IE in the seventh FAR may include one or more VLAN parameters.

S303. The session management network element sends the seventh routing information to the first user plane network element, so that the first user plane network element receives the seventh routing information sent by the session management network element.

S304. The first user plane network element stores the seventh routing information.

S305. The session management network element generates eighth routing information based on the VLAN information of the fourth port.

The eighth routing information is used by the first user plane network element to handle an eighth packet. The eighth packet is a packet to be sent by the first user plane network element to the data network through the fourth port. In other words, the eighth packet is a packet to be sent by the first user plane network element to the device or the server in the data network through the fourth port.

In a possible design, a VLAN parameter included in the eighth routing information is unrelated to the interface mode of the fourth port. In other words, regardless of a type of the fourth port, the eighth routing information includes the allowed VID list of the fourth port and the untagged VID list of the fourth port.

It may be understood that, when the fourth port is an access port, both the allowed VID list and the untagged VID list of the fourth port include only the default VID of the fourth port. When the fourth port is a trunk port, the untagged VID list of the fourth port includes only the default VID of the fourth port.

Optionally, that the eighth routing information is used by the first user plane network element to handle an eighth packet includes a combination of one or more of the following:

(8-1) the eighth routing information indicates the first user plane network element to discard the eighth packet when the allowed VID list of the fourth port does not include a VID carried in the eighth packet;

(8-2) the eighth routing information indicates the first user plane network element to send the eighth packet when the allowed VID list of the fourth port includes a VID carried in the eighth packet and the untagged VID list of the fourth port does not include the VID carried in the eighth packet; or (8-3) the eighth routing information indicates the first user plane network element to remove a VID carried in the eighth packet, and send the eighth packet without the VID when the allowed VID list of the fourth port includes the VID carried in the eighth packet and the untagged VID list of the fourth port includes the VID carried in the eighth packet.

In another possible design, a VLAN parameter included in the eighth routing information is related to the interface mode of the fourth port. Therefore, the fourth routing information includes the following three cases:

Case 1: When the fourth port is an access port, the eighth routing information includes the default VID of the fourth port, and does not include the allowed VID list or the untagged VID list of the fourth port. In this case, that the eighth routing information is used by the first user plane network element to handle an eighth packet includes a combination of one or more of the following:

(8-4) the eighth routing information indicates the first user plane network element to discard the eighth packet when a VID carried in the eighth packet is different from the default VID of the fourth port; or (8-5) the eighth routing information indicates the first user plane network element to remove a VID carried in the eighth packet, and send the eighth packet without the VID when the VID carried in the eighth packet is the same as the default VID of the fourth port.

Case 2: When the fourth port is a trunk port, the eighth routing information includes the default VID of the fourth port and the allowed VID list of the fourth port, and does not include the untagged VID list of the fourth port. In this case, that the eighth routing information is used by the first user plane network element to handle an eighth packet includes a combination of one or more of the following:

(8-1) the eighth routing information indicates the first user plane network element to discard the eighth packet when the allowed VID list of the fourth port does not include a VID carried in the eighth packet;

(8-6) the eighth routing information indicates the first user plane network element to send the eighth packet when the allowed VID list of the fourth port includes a VID carried in the eighth packet and the VID carried in the eighth packet is different from the default VID of the fourth port; or (8-7) the eighth routing information indicates the first user plane network element to remove a VID carried in the eighth packet, and send the eighth packet without the VID when the allowed VID list of the fourth port includes the VID carried in the eighth packet and the VID carried in the eighth packet is the same as the default VID of the fourth port.

Case 3: When the fourth port is a hybrid port, the eighth routing information includes the allowed VID list of the fourth port and the untagged VID list of the fourth port. In this case, that the eighth routing information is used by the first user plane network element to handle an eighth packet includes at least one of (8-1) to (8-3).

Optionally, when the VLAN information of the fourth port includes the second action indication, the session management network element may further determine the eighth routing information based on the second action indication.

For example, if the second action indication includes the operation 2-2, the eighth routing information does not include the VLAN parameter. Therefore, the eighth routing information indicates the first user plane network element to send the eighth packet.

For another example, if the second action indication includes the operation 2-4, the eighth routing information includes the default VID or the untagged VID list of the fourth port. Therefore, that the eighth routing information is used by the first user plane network element to handle an eighth packet includes at least (8-3), (8-5), or (8-7).

For another example, if the second action indication includes the operation 2-6, the eighth routing information does not include the allowed VID list of the fourth port. Therefore, that the eighth routing information is used by the first user plane network element to handle an eighth packet does not include (8-2), (8-3), (8-6), or (8-7).

For another example, if the second action indication includes the operation 2-8, the eighth routing information includes the allowed VID list of the fourth port. Therefore, that the eighth routing information is used by the first user plane network element to handle an eighth packet includes at least (8-2) and (8-3). Alternatively, that the eighth routing information is used by the first user plane network element to handle an eighth packet includes at least (8-6) and (8-7).

For another example, if the second action indication includes the operation 2-10, the eighth routing information does not include the S-TAG. Therefore, that the eighth routing information is used by the first user plane network element to handle an eighth packet does not include (8-8) in the following.

For another example, if the second action indication includes the operation 2-12, the eighth routing information includes the S-TAG. Therefore, that the eighth routing information is used by the first user plane network element to handle an eighth packet includes (8-8) in the following:

(8-8) the eighth routing information indicates the first user plane network element to remove the S-TAG from the eighth packet.

In this embodiment of this application, the eighth routing information may be an eighth PDR or an eighth FAR.

For example, when the eighth routing information is the eighth PDR, packet detection information, an outer header removal IE, or another extended IE in the eighth PDR may include one or more VLAN parameters (for example, the allowed VID list of the fourth port and the untagged VID list of the fourth port).

For example, when the eighth routing information is the eighth FAR, an action IE, an outer header creation IE, a forwarding policy IE, a container for header enrichment IE, or another extended IE in the eighth FAR may include one or more VLAN parameters.

S306. The session management network element sends the eighth routing information to the first user plane network element, so that the first user plane network element receives the eighth routing information sent by the session management network element.

S307. The first user plane network element stores the eighth routing information.

An order of performing steps S302 to S304 and steps S305 to S307 is not limited in this embodiment of this application. For example, steps S302 to S304 may be performed before steps S305 to S307; steps S305 to S307 may be performed before steps S302 to S304; or steps S302 to S304 and steps S305 to S307 are simultaneously performed.

The technical solution shown in FIG. 9 may be applied to a process in which the first terminal or another terminal served by the first user plane network element establishes/modifies a PDU session.

Based on the technical solution shown in FIG. 9, the VLAN information of the fourth port may reflect a networking manner and a VLAN configuration of the data network. The seventh routing information and the eighth routing information are generated based on the VLAN information of the fourth port. Therefore, the first user plane network element may handle the seventh packet based on the seventh routing information, and handle the eighth packet based on the eighth routing information, so that a manner in which the first user plane network element handles a packet may adapt to the networking manner and the VLAN configuration of the data network, to ensure forwarding of an Ethernet packet in a scenario in which a 5GLAN communicates with an external LAN.

In this embodiment of this application, that the packet carries the VID means that the packet carries a VLAN tag, where the VLAN tag includes the VID. Correspondingly, the VID carried in the packet is the VID in the VLAN tag carried in the packet.

In this embodiment of this application, that the default VID is added to the packet means that a VLAN tag is added to the packet, where the VLAN tag includes the default VID.

In this embodiment of this application, that the VID of the packet is removed means that the VLAN tag of the packet is removed.

The foregoing mainly describes the solutions in embodiments of this application from a perspective of interaction between the network elements. It may be understood that, to implement the foregoing functions, the network elements such as the session management network element and the user plane network element each include a corresponding hardware structure and/or a software module for performing each function. A person skilled in the art should easily be aware that, in combination with the units and algorithm steps in the examples described in embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the session management network element and the user plane network element may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, division into the units is an example, and is merely logical function division. During actual implementation, another division manner may be used.

Figure 10:
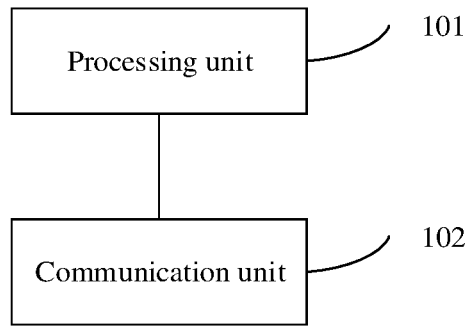
FIG. 10 is a schematic diagram of a structure of a communication apparatus according to an embodiment of this application.

When an integrated unit is used, FIG. 10 shows a communication apparatus in the foregoing embodiments. The communication apparatus may include a processing unit 101 and a communication unit 102.

In an example, the communication apparatus may be the session management network element mentioned above, or a chip used in the session management network element. In this case, the processing unit 101 is configured to support the session management network element in performing steps S101, S102, and S105 in FIG. 7, steps S201 to S203, S206, and S207 in FIG. 8, steps S301, S302, and S305 in FIG. 9, and/or another processing operation that needs to be performed by the session management network element in embodiments of this application. The communication unit 102 is configured to support the session management network element in performing steps S103 and S106 in FIG. 7, steps S204 and S208 in FIG. 8, steps S303 and S306 in FIG. 9, and/or another communication operation that needs to be performed by the session management network element in embodiments of this application.

In another example, the communication apparatus may be the first user plane network element mentioned above, or a chip used in the first user plane network element. In this case, the processing unit 101 is configured to support the first user plane network element in performing steps S104 and S107 in FIG. 7, step S205 in FIG. 8, steps S304 and S307 in FIG. 9, and/or another processing operation that needs to be performed by the first user plane network element in embodiments of this application. The communication unit 102 is configured to support the first user plane network element in performing steps S103 and S106 in FIG. 7, step S204 in FIG. 8, steps S303 and S306 in FIG. 9, and/or another communication operation that needs to be performed by the first user plane network element in embodiments of this application.

In another example, the communication apparatus may be the second user plane network element mentioned above, or a chip used in the second user plane network element. In this case, the processing unit 101 may support the second user plane network element in performing step S209 in FIG. 8, and/or another processing operation that needs to be performed by the second user plane network element in embodiments of this application. The communication unit 102 is configured to support the second user plane network element in performing step S208 in FIG. 8, and/or another communication operation that needs to be performed by the second user plane network element in embodiments of this application.

When the integrated unit in FIG. 10 is implemented in a form of a software functional module and sold or used as an independent product, the integrated unit may be stored in a computer-readable storage medium. Based on such an understanding, the technical solutions in embodiments of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor to perform all or some of the steps of the methods in embodiments of this application. The storage medium that stores the computer software product includes any medium that can store program code, such as a USB flash drive, a removable hard disk, a read-only memory (ROM), a random access memory (RAM), a magnetic disk, or an optical disc.

A unit in FIG. 10 may also be referred to as a module. For example, a processing unit may be referred to as a processing module, and a communication unit may be referred to as a communication module.

Figure 11:
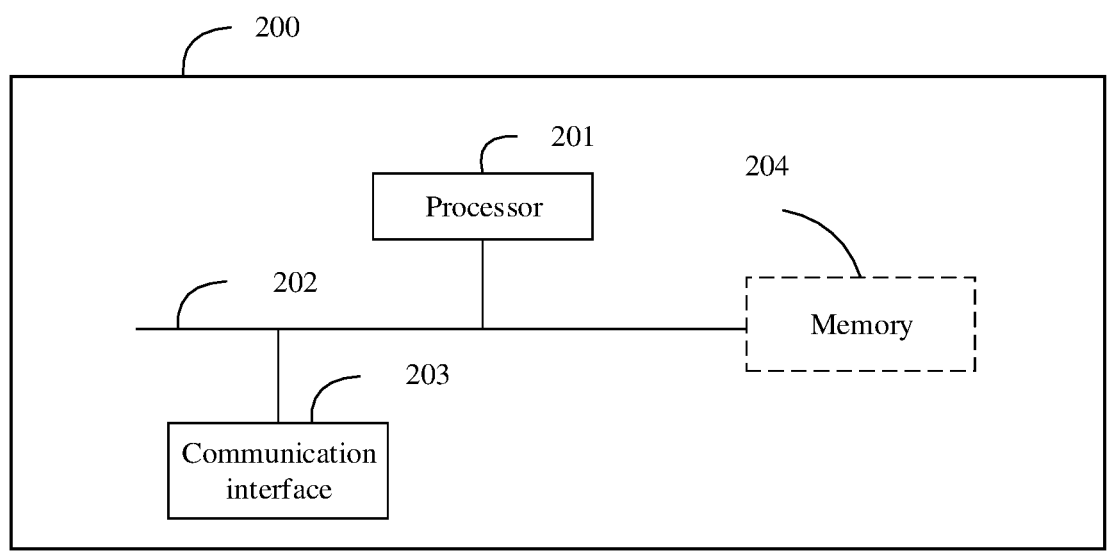
FIG. 11 is a schematic diagram of a structure of another communication apparatus according to an embodiment of this application.

FIG. 11 is a schematic diagram of a hardware structure of a communication apparatus according to an embodiment of this application. The communication apparatus 200 includes one or more processors 201 and a communication interface 203.

Optionally, the communication apparatus 200 further includes a memory 204. The memory 204 may include a read-only memory and a random access memory, and provide operation instructions and data for the processor 201. A part of the memory 204 may further include a non-volatile random access memory (NVRAM).

In this embodiment of this application, the communication apparatus 200 invokes the operation instructions (where the operation instructions may be stored in an operating system) stored in the memory 204, to perform a corresponding operation.

The processor 201 may also be referred to as a central processing unit (CPU).

The processor 201, the communication interface 203, and the memory 204 are coupled together by using a bus system 202. The bus system 202 may further include a power bus, a control bus, a status signal bus, and the like in addition to a data bus. However, for clarity of description, various types of buses in FIG. 11 are marked as the bus system 202.

The methods disclosed in embodiments of this application may be applied to the processor 201 or may be implemented by the processor 201. The processor 201 may be an integrated circuit chip and has a signal processing capability. In an implementation process, the steps in the foregoing methods may be implemented by using a hardware integrated logical circuit in the processor 201, or by using instructions in a form of software. The processor 201 may be a general-purpose processor, a digital signal processor (DSP), an application specific integrated circuit (ASIC), a field-programmable gate array (FPGA), or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 204, and the processor 201 reads information in the memory 204 and completes the steps in the foregoing methods in combination with hardware of the processor 201.

For example, the processing unit 101 in FIG. 10 may be implemented by the processor 201 in FIG. 11, and the communication unit 102 in FIG. 10 may be implemented by the communication interface 203 in FIG. 11.

The foregoing communication unit or communication interface may be an interface circuit or a communication interface in the apparatus for receiving a signal from another apparatus. For example, when the apparatus is implemented as a chip, the communication unit or communication interface is an interface circuit or a communication interface in the chip for receiving a signal from or sending a signal to another chip or apparatus.

In the foregoing embodiment, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk, SSD), or the like.

Optionally, an embodiment of this application further provides a computer-readable storage medium. The computer-readable storage medium stores computer instructions. When the computer-readable storage medium runs on a computer, the computer is enabled to perform the route configuration method provided in embodiments of this application.

An embodiment of this application further provides a computer program product that includes computer instructions. When the computer program product runs on a computer, the computer is enabled to perform the route configuration methods provided in embodiments of this application.

An embodiment of this application provides a chip. The chip includes a processor. When the processor executes instructions, the chip is enabled to perform the route configuration methods provided in embodiments of this application.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
obtaining, by a session management network element, virtual local area network (VLAN) information of a first port, wherein the first port is of a first user plane network element and corresponds to an established protocol data unit (PDU) session of a first terminal, and the first user plane network element serves the first terminal;

generating, by the session management network element, first routing information and second routing information based on the VLAN information of the first port, wherein the first routing information is configured to be used by the first user plane network element to handle a first packet, the first packet is an uplink packet of the first terminal received by the first user plane network element through the first port, the second routing information is configured to be used by the first user plane network element to handle a second packet, and the second packet is a downlink packet sent by the first user plane network element to the first terminal through the first port; and sending, by the session management network element, the first routing information and the second routing information to the first user plane network element.

2. The method according to claim 1, wherein the VLAN information of the first port comprises one or more of the following: a default virtual local area network identifier (VID) of the first port, an allowed VID list of the first port, or an untagged VID list of the first port.

3. The method according to claim 2, wherein the first routing information comprises the default VID of the first port and the allowed VID list of the first port; and
  wherein the first routing information being used by the first user plane network element to handle the first packet comprises one or more of the following:
    the first routing information indicates to the first user plane network element to add the default VID of the first port to the first packet when the first packet does not carry a VID;
    the first routing information indicates to the first user plane network element to accept the first packet when the allowed VID list of the first port comprises a VID carried in the first packet; or
    the first routing information indicates to the first user plane network element to discard the first packet when the allowed VID list of the first port does not comprise a VID carried in the first packet.

4. The method according to claim 2, wherein the second routing information comprises the default VID of the first port; and
  wherein the second routing information being configured to be used by the first user plane network element to handle a second packet comprises one or more of the following:
    the second routing information indicates to the first user plane network element to discard the second packet when a VID carried in the second packet is different from the default VID of the first port; or
    the second routing information indicates to the first user plane network element to remove a VID carried in the second packet and send the second packet without the VID through the first port when the VID carried in the second packet is the same as the default VID of the first port.

5. The method according to claim 2, wherein the second routing information comprises the default VID of the first port and the allowed VID list of the first port; and
  wherein the second routing information being configured to be used by the first user plane network element to handle the second packet comprises one or more of the following:
    the second routing information indicates to the first user plane network element to discard the second packet when the allowed VID list of the first port does not comprise a VID carried in the second packet;
    the second routing information indicates to the first user plane network element to send the second packet through the first port when the allowed VID list of the first port comprises a VID carried in the second packet and the VID carried in the second packet is different from the default VID of the first port; or
    the second routing information indicates to the first user plane network element to remove a VID carried in the second packet and send the second packet without the VID through the first port when the allowed VID list of the first port comprises the VID carried in the second packet and the VID carried in the second packet is the same as the default VID of the first port.

6. The method according to claim 1, wherein obtaining, by the session management network element, the VLAN information of the first port comprises:
  obtaining, by the session management network element, VLAN information of the first terminal, wherein the VLAN information of the first terminal comprises one or more of the following VLAN parameters: a service provider tag (S-TAG), an allowed VID list, or a default VID; and
  determining, by the session management network element, the VLAN information of the first port based on the VLAN information of the first terminal.

7. The method according to claim 6, wherein the VLAN information of the first terminal further comprises a first action indication, the first action indication indicates an operation on an uplink packet sent by the first terminal or a downlink packet to be sent to the first terminal, and the operation comprises one or more of the following:
  adding the default VID of the first port to the uplink packet;
  removing the default VID of the first port from the downlink packet;
  skipping determining, based on the allowed VID list of the first port, whether to allow transmission of the uplink packet;
  skipping determining, based on the allowed VID list of the first port, whether to allow transmission of the downlink packet;
  determining, based on the allowed VID list of the first port, whether to allow transmission of the uplink packet;
  determining, based on the allowed VID list of the first port, whether to allow transmission of the downlink packet;
  skipping adding the S-TAG to the uplink packet;
  skipping removing the S-TAG from the downlink packet;
  adding the S-TAG to the uplink packet; or
  removing the S-TAG from the downlink packet.

8. The method according to claim 6, wherein obtaining, by the session management network element, the VLAN information of the first terminal comprises:
  obtaining, by the session management network element, the VLAN information of the first terminal from the first terminal, an authentication server, a data management network element, or a policy control function network element.

9. A method, comprising:
  receiving, by a first user plane network element, first routing information and second routing information that are sent by a session management network element, wherein the first user plane network element serves a first terminal, the first routing information and the second routing information are generated based on virtual local area network (VLAN) information of a first port, the first routing information is used by the first user plane network element to handle a first packet, the first packet is an uplink packet of the first terminal received by the first user plane network element through the first port, the second routing information is used by the first user plane network element to handle a second packet, the second packet is a downlink packet sent by the first user plane network element to the first terminal through the first port, and the first port is on the first user plane network element and corresponds to an established protocol data unit (PDU) session of the first terminal; and storing, by the first user plane network element, the first routing information and the second routing information.

10. The method according to claim 9, wherein the VLAN information of the first port comprises one or more of the following: a default virtual local area network identifier (VID) of the first port, an allowed VID list of the first port, or an untagged VID list of the first port.

11. The method according to claim 10, wherein the first routing information comprises the default VID of the first port and the allowed VID list of the first port; and wherein the first routing information being used by the first user plane network element to handle the first packet comprises one or more of the following:

the first routing information indicates to the first user plane network element to add the default VID of the first port to the first packet when the first packet does not carry a VID;

the first routing information indicates to the first user plane network element to accept the first packet when the first packet carries a VID and the allowed VID list of the first port comprises the VID carried in the first packet; or the first routing information indicates to the first user plane network element to discard the first packet when the first packet carries a VID and the allowed VID list of the first port does not comprise the VID carried in the first packet.

12. The method according to claim 10, wherein the second routing information comprises the default VID of the first port and the allowed VID list of the first port; and wherein the second routing information being used by the first user plane network element to handle a second packet comprises one or more of the following:

the second routing information indicates to the first user plane network element to discard the second packet when the allowed VID list of the first port does not comprise a VID carried in the second packet;

the second routing information indicates to the first user plane network element to send the second packet through the first port when the allowed VID list of the first port comprises a VID carried in the second packet and the VID carried in the second packet is different from the default VID of the first port; or the second routing information indicates to the first user plane network element to remove a VID carried in the second packet and send the second packet without the VID through the first port when the allowed VID list of the first port comprises the VID carried in the second packet and the VID carried in the second packet is the same as the default VID of the first port.

13. An apparatus, comprising:

a processor coupled to a non-transitory memory storing instructions that are executable by the processor to cause the apparatus to:

obtain virtual local area network (VLAN) information of a first port, wherein the first port is of a first user plane network element and corresponds to an established protocol data unit (PDU) session of a first terminal, and the first user plane network element serves the first terminal;

generate first routing information and second routing information based on the VLAN information of the first port, wherein the first routing information is configured to be used by the first user plane network element to handle a first packet, the first packet is an uplink packet of the first terminal received by the first user plane network element through the first port, the second routing information is configured to be used by the first user plane network element to handle a second packet, and the second packet is a downlink packet sent by the first user plane network element to the first terminal through the first port; and send the first routing information and the second routing information to the first user plane network element.

14. The apparatus according to claim 13, wherein the VLAN information of the first port comprises one or more of the following: a default virtual local area network identifier (VID) of the first port, an allowed VID list of the first port, or an untagged VID list of the first port.

15. The apparatus according to claim 14, wherein the first routing information comprises the default VID of the first port and the allowed VID list of the first port; and wherein the first routing information being configured to be used by the first user plane network element to handle a first packet comprises one or more of the following:

the first routing information indicates to the first user plane network element to add the default VID of the first port to the first packet when the first packet does not carry a VID;

the first routing information indicates to the first user plane network element to accept the first packet when the allowed VID list of the first port comprises a VID carried in the first packet; or the first routing information indicates to the first user plane network element to discard the first packet when the allowed VID list of the first port does not comprise a VID carried in the first packet.

16. The apparatus according to claim 14, wherein the second routing information comprises the default VID of the first port; and wherein the second routing information being configured to be used by the first user plane network element to handle the second packet comprises one or more of the following:

the second routing information indicates the first user plane network element to discard the second packet when a VID carried in the second packet is different from the default VID of the first port; or the second routing information indicates the first user plane network element to remove a VID carried in the second packet and send the second packet without the VID through the first port when the VID carried in the second packet is the same as the default VID of the first port.

17. The apparatus according to claim 14, wherein the second routing information comprises the default VID of the first port and the allowed VID list of the first port; and wherein the second routing information being configured to be used by the first user plane network element to handle the second packet comprises one or more of the following:

the second routing information indicates to the first user plane network element to discard the second packet when the allowed VID list of the first port does not comprise a VID carried in the second packet;

the second routing information indicates to the first user plane network element to send the second packet through the first port when the allowed VID list of the first port comprises a VID carried in the second packet and the VID carried in the second packet is different from the default VID of the first port; or the second routing information indicates to the first user plane network element to remove a VID carried in the second packet and send the second packet without the VID through the first port when the allowed VID list of the first port comprises the VID carried in the second packet and the VID carried in the second packet is the same as the default VID of the first port.

18. The apparatus according to claim 13, wherein the instructions are further executable by the processor to cause the apparatus to:
   obtain VLAN information of the first terminal, wherein the VLAN information of the first terminal comprises one or more of the following VLAN parameters: a service provider tag (S-TAG), an allowed VID list, or a default VID; and
   determine the VLAN information of the first port based on the VLAN information of the first terminal.

19. The apparatus according to claim 13, wherein the VLAN information of the first terminal further comprises a first action indication, the first action indication indicates an operation on an uplink packet sent by the first terminal or a downlink packet sent to the first terminal, and the operation comprises one or more of the following:
   adding the default VID of the first port to the uplink packet;
   removing the default VID of the first port from the downlink packet;
   skipping determining, based on the allowed VID list of the first port, whether to allow transmission of the uplink packet;
   skipping determining, based on the allowed VID list of the first port, whether to allow transmission of the downlink packet;
   determining, based on the allowed VID list of the first port, whether to allow transmission of the uplink packet;
   determining, based on the allowed VID list of the first port, whether to allow transmission of the downlink packet;
   skipping adding the S-TAG to the uplink packet;
   skipping removing the S-TAG from the downlink packet;
   adding the S-TAG to the uplink packet; or
   removing the S-TAG from the downlink packet.

* * * * *